Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr.
Attorney Aug. 10, 1954 G. C. HARTLEY ET AL 2,686,224

REGISTER TRANSLATOR FOR TELECOMMUNICATION SWITCHING SYSTEMS

Filed Feb. 11, 1950 21 Sheets-Sheet 5

Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr.
Attorney Aug. 10, 1954 G. C. HARTLEY ET AL 2,686,224

REGISTER TRANSLATOR FOR TELECOMMUNICATION SWITCHING SYSTEMS

Filed Feb. 11, 1950 21 Sheets-Sheet 7

Inventors
GEORGE C. HARTLEY
FREDERICK H. BRAY
MAURICE C. BRANCH
By Robert Harding Jr.
Attorney Aug. 10, 1954 G. C. HARTLEY ET AL 2,686,224

REGISTER TRANSLATOR FOR TELECOMMUNICATION SWITCHING SYSTEMS

Filed Feb. 11, 1950 21 Sheets-Sheet 8

Inventors
GEORGE C. HARTLEY
FREDERICK H. BRANCH
MAURICE C. BRANCH

By Robert Harding Jr.
Attorney

REGISTER TRANSLATOR FOR TELECOMMUNICATION SWITCHING SYSTEMS

Filed Feb. 11, 1950 21 Sheets-Sheet 9

Inventors
GEORGE C. HARTLEY
FREDERICK H. BRAY
MAURICE C. BRANCH
By Robert Harding Jr.
Attorney

REGISTER TRANSLATOR FOR TELECOMMUNICATION SWITCHING SYSTEMS

Filed Feb. 11, 1950 21 Sheets-Sheet 10

Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr.
Attorney

REGISTER TRANSLATOR FOR TELECOMMUNICATION SWITCHING SYSTEMS

Filed Feb. 11, 1950 21 Sheets-Sheet 12

Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr.
Attorney Notes 1
Translation is marked by pulses P18-41, P42
2
FIG. 13. to be turned around to fit.

Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr.
Attorney Inventors
GEORGE C. HARTLEY
FREDERICK H. BRAY
MAURICE C. BRANCH
By Robert Harding Jr
Attorney Aug. 10, 1954 G. C. HARTLEY ET AL 2,686,224

REGISTER TRANSLATOR FOR TELECOMMUNICATION SWITCHING SYSTEMS

Filed Feb. 11, 1950 21 Sheets-Sheet 20

Inventors
GEORGE C. HARTLEY
FREDERICK H. BRAY
MAURICE C. BRANCH

By Robert Harding Jr.
Attorney

Aug. 10, 1954 G. C. HARTLEY ET AL 2,686,224
REGISTER TRANSLATOR FOR TELECOMMUNICATION SWITCHING SYSTEMS
Filed Feb. 11, 1950 21 Sheets-Sheet 21

Inventors
GEORGE C. HARTLEY
FREDERICK H. BRAY
MAURICE C. BRANCH
By Robert Harding Jr.
Attorney Patented Aug. 10, 1954

2,686,224

UNITED STATES PATENT OFFICE 2,686,224

REGISTER TRANSLATOR FOR TELECOMMUNICATION SWITCHING SYSTEMS

George Clifford Hartley, Frederick Harry Bray, and Maurice Charles Branch, London, England, assignors to International Standard Electric Corporation, New York, N. Y., a corporation of Delaware Application February 11, 1950, Serial No. 143,694

Claims priority, application Great Britain February 14, 1949

18 Claims. (Cl. 179—18)

This invention relates to electrical equipment in which sets of signals can be translated into respective predetermined different sets of signals.

In, for instance, automatic telephone switching systems, it is known to provide registers into which the destination digits and the line number digits of a required connection are transmitted and stored, and to provide the registers with access to translating means whereby the destination digits are translated into routing digits which may also be stored in the register and transmitted therefrom at a time suitable for operating the switching equipment.

The invention provides a register or signal-receiver and a translator, the method of operation being such that the occupancy time of the translator is small compared to that of the register whereby the translator may be made available through the medium of simple connecting arrangements to a plurality of registers.

One feature of the invention comprises electrical equipment in which a number of sets of signals can be translated into respective predetermined different sets of signals, comprising a number of signal-receiving means, and translating means common to said signal-receiving means, and comprising means for supplying pulses spaced in time within a predetermined time cycle by means of which sets of signals received by the receiving means are transferred to said common translating means.

Another feature of the invention comprises electrical equipment in which a number of sets of signals can be translated into respective predetermined different sets of signals, comprising a number of signal-receiving means, and translating means common to said signal-receiving means, and arranged so that sets of signals received by the receiving means are transferred on a time-pulse basis to said common translating means.

A further feature of the invention comprises electrical equipment in which a number of sets of signals can be translated into respective predetermined different sets of signals, comprising a number of signal-receiving means, and translating means common to said signal-receiving means, and comprising means for supplying pulses spaced in time within a predetermined time cycle by means of which translated sets of signals are transferred from the common translator to the receiving means.

A further feature of the invention comprises electrical equipment in which a number of sets of signals can be translated into respective predetermined different sets of signals, comprising a number of signal-receiving means, and translating means common to said signal-receiving means, and arranged so that translated sets of signals are transferred on a time-pulse basis from said common translating means to said receiving means.

A further feature of the invention comprises electrical equipment in which a number of sets of signals can be translated into respective predetermined different sets of signals, comprising a number of signal receiving means, and translating means common to said signal-receiving means, in which each signal-receiving means comprises storage units for storing signals which are not to be translated and storage units for storing a variable number of translated signals, which comprises means for sending out stored translated signals in sequence followed by said stored untranslated signals, which comprises means for detecting the first empty translated digit storage means during the sending sequence, and which comprises means controlled by said detecting means for initiating transmission of said stored untranslated signals.

A further feature of the invention comprises electrical equipment in which a number of sets of signals can be translated into respective predetermined different sets of signals, comprising a number of signal-receiving means, and translating means common to said signal-receiving means, in which each signal-receiving means comprises storage units for storing signals which are not to be translated and storage units for storing translated signals, in which said common translating means comprises discriminating means for detecting signal combinations received unaccompanied by signals which are not to be translated, means in the common translator for sending a discriminating signal to a signal-receiving means when said discriminating means is operated, and signal responsive means associated with each signal-receiving means adapted to respond to said discriminating signal and to modify the operation of the signal-receiving means accordingly.

A further feature of the invention comprises electrical equipment in which a number of sets of signals can be translated into respective predetermined different sets of signals, comprising a number of signal-receiving means, and translating means common to said signal-receiving means, and comprising translating means individual to a signal-receiving means for translating a particular set or sets of signals, but not all sets of signals which the said signal-receiving means is capable of receiving.

A further feature of the invention comprises electrical equipment in which a number of sets of signals can be translated into respective predetermined different sets of signals, comprising a number of signal-receiving means, and translating means common to said signal-receiving means, and comprising means for temporarily interconnecting any one signal-receiving means to said translating means and arranged to respond to pulses spaced in a predetermined time cycle, a different time position of which is allocated to each of the signal-receiving means, and to interconnect a given signal-receiving means to said common translating means in response to a pulse in the corresponding time position.

A further feature of the invention comprises electrical equipment in which a number of sets of signals can be translated into respective predetermined different sets of signals comprising a number of signal-receiving means, and translating means common to said signal-receiving means, and in which said common translating means comprises a number of electrical devices each arranged to be operated in response to a corresponding one of said sets of signals and to characterise the corresponding translated set of signals.

A further feature of the invention comprises electrical equipment in which signals are received in a register and are translated by a translator into a predetermined translation, which translation is also received in the register characterised in this that the register comprises electric discharge tubes for both receiving and registering both said signals and said translation, and the translator comprises electric discharge tubes for both receiving from the register the signals to be translated and for transmitting to the register said predetermined translation.

One specific embodiment of the invention will now be described in detail, by way of example, with reference to the accompanying drawings in which.

Figure 8:
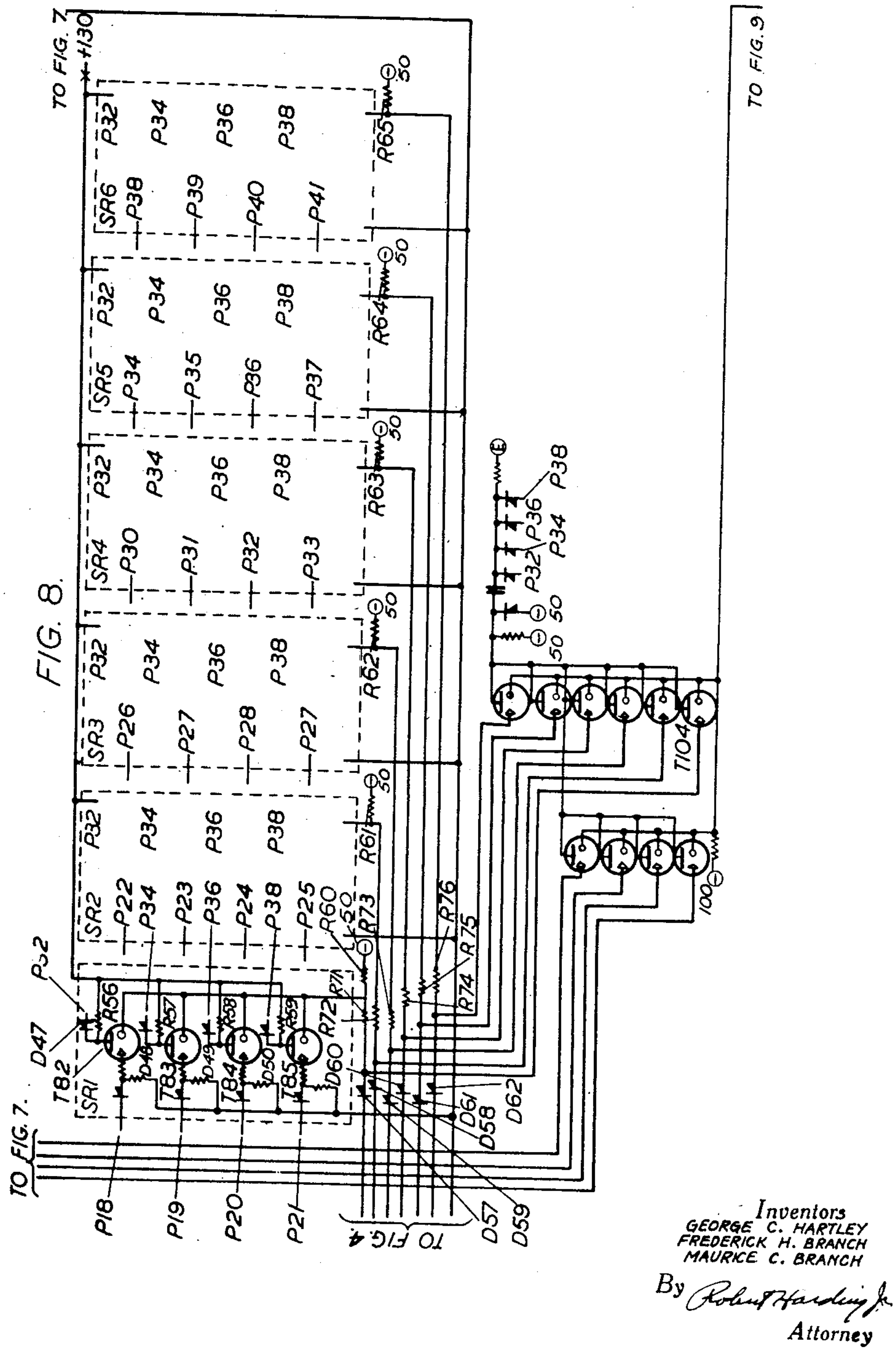
Figure 9:
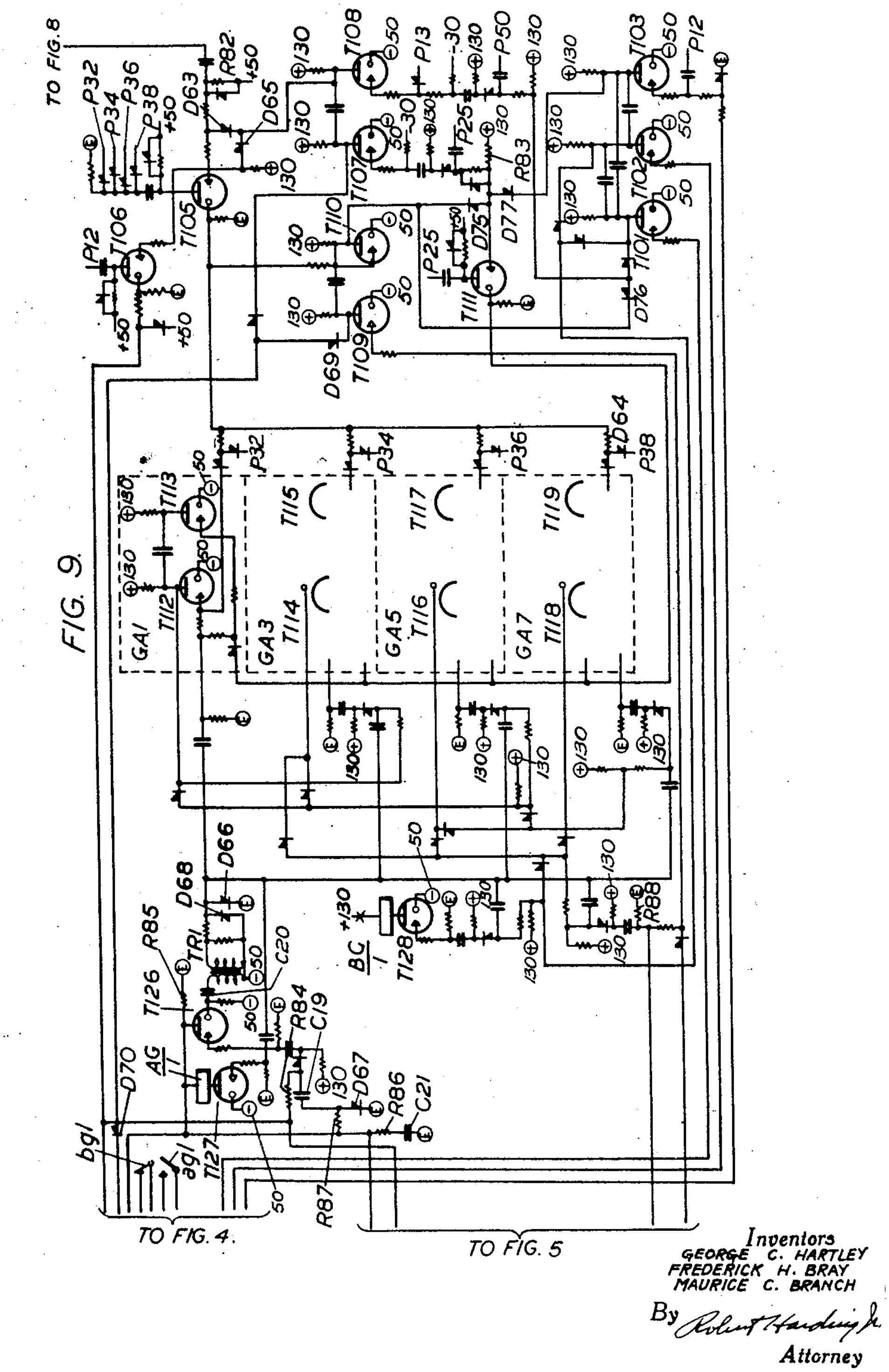
Figure 10:
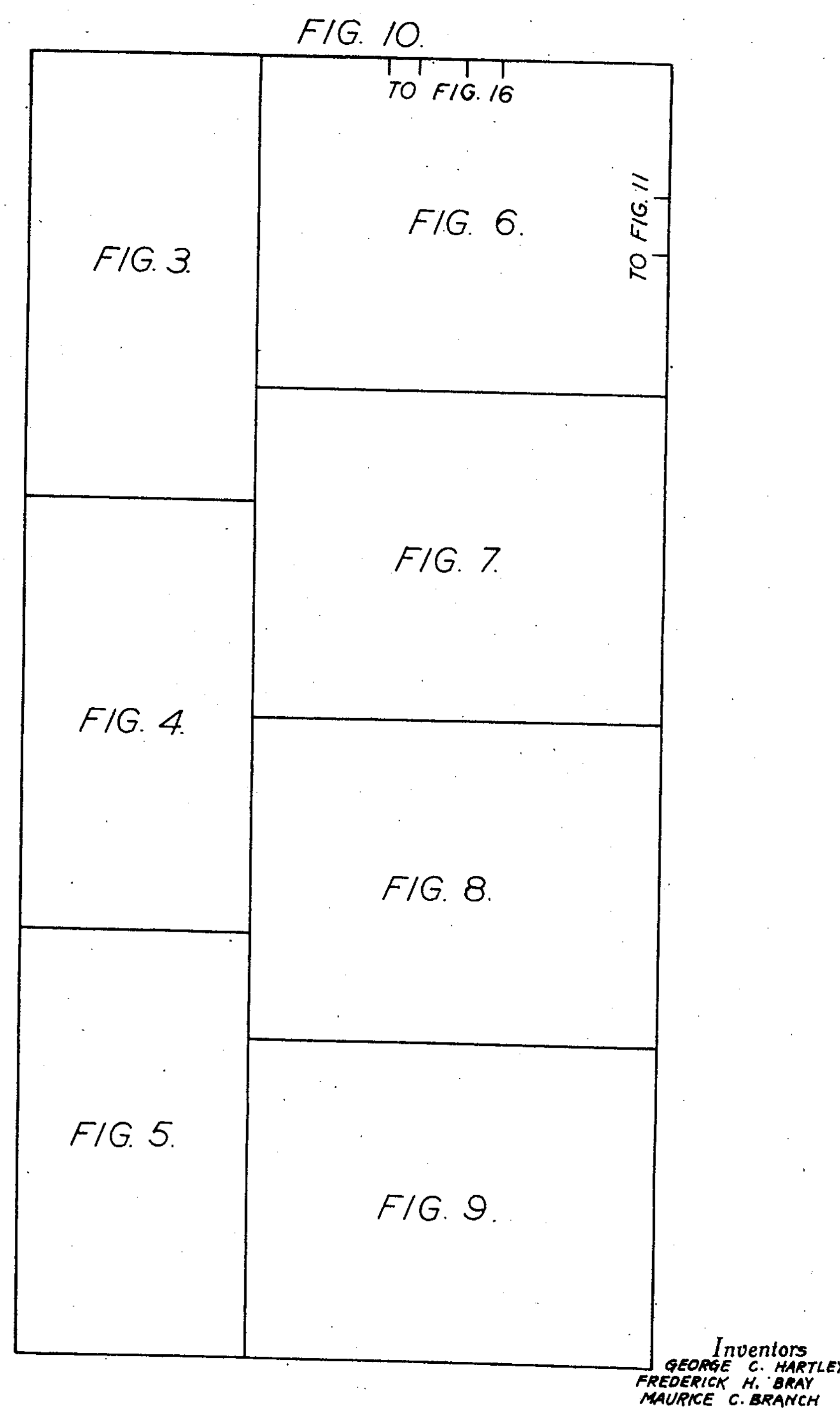
Figure 14:
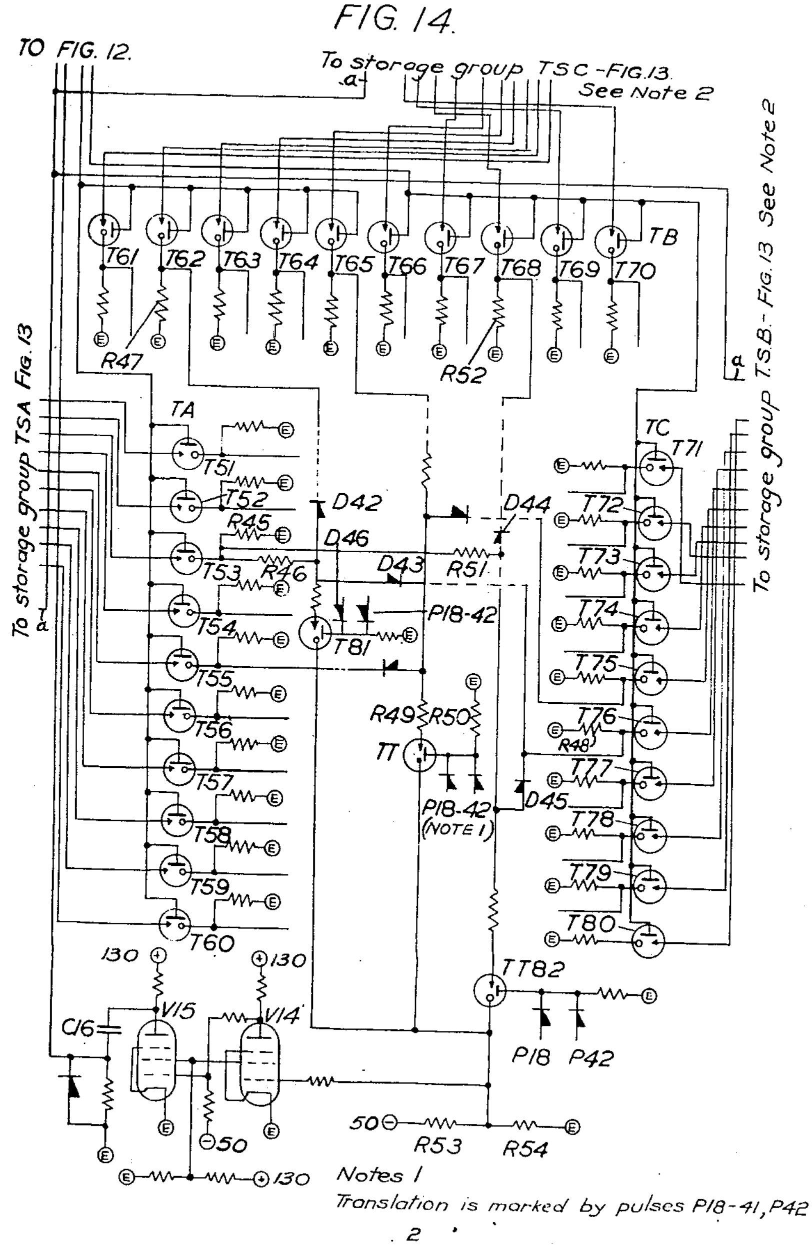
Figure 15:
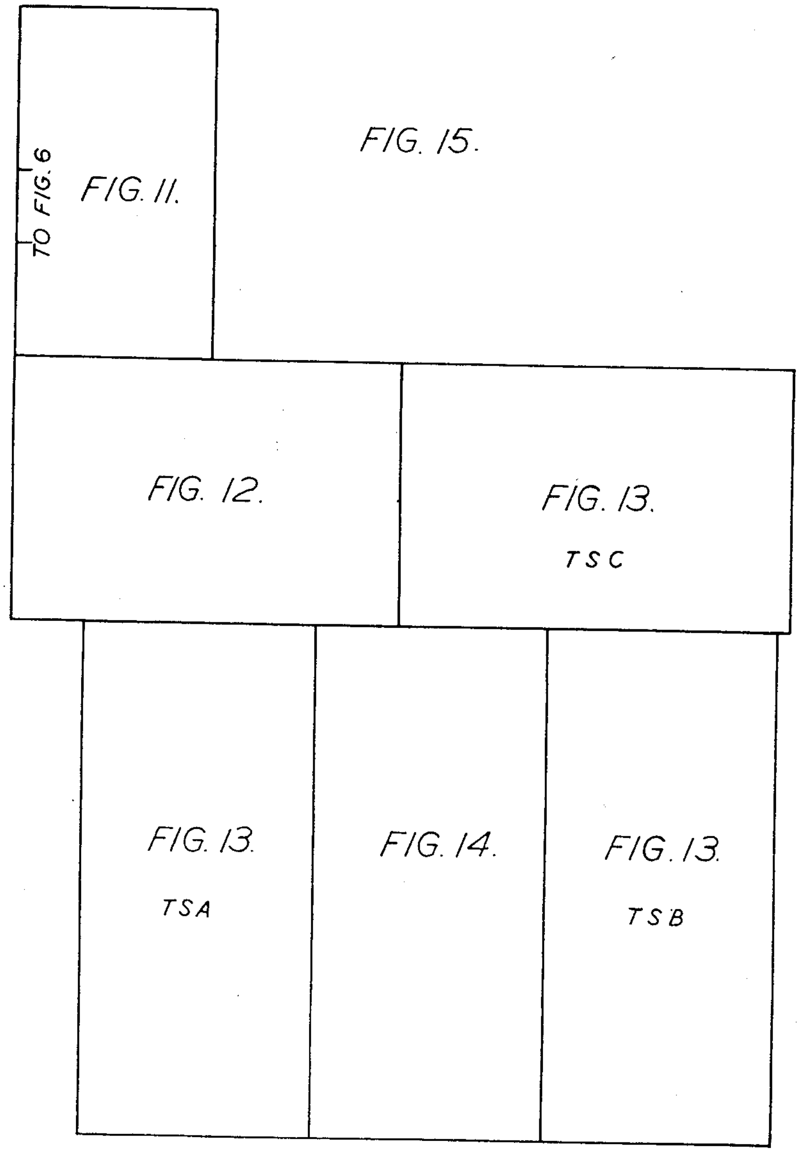
Figure 16:
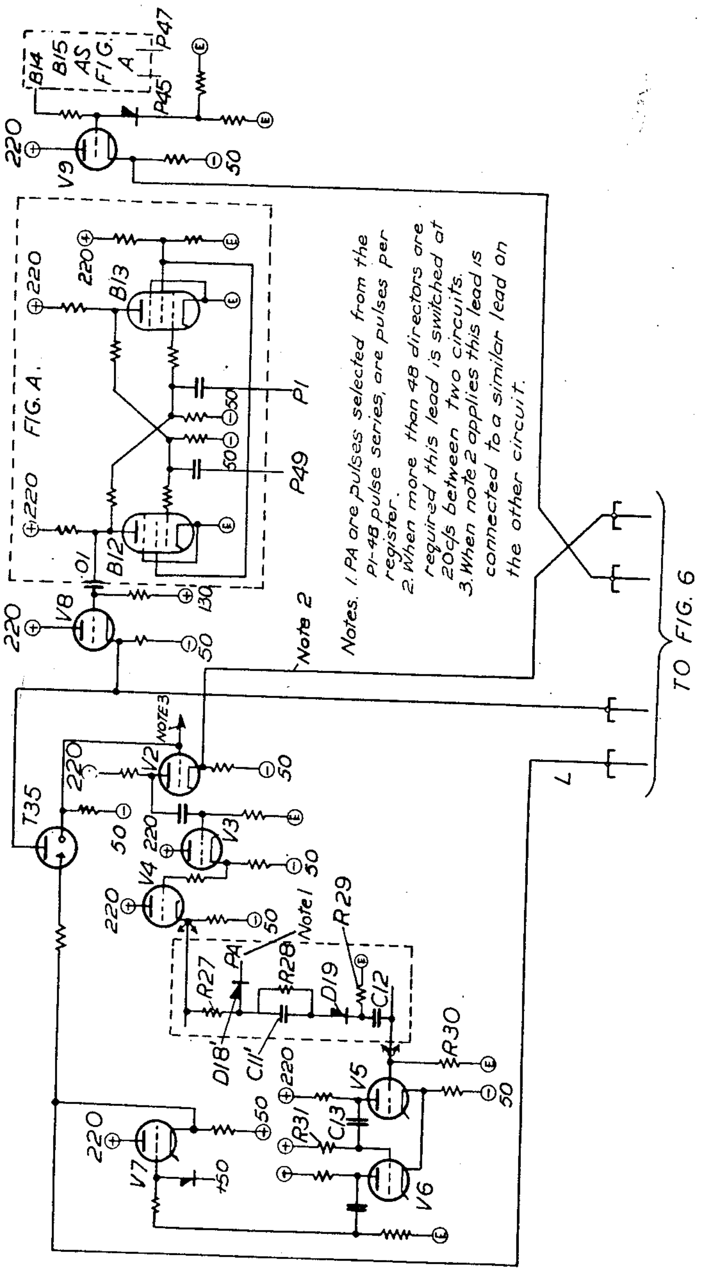

Figs. 3–9 assembled together as shown in Fig. 10 show the register circuit in detail;

Figs. 11–14 assembled together as shown in Fig. 15 show the translator circuit in detail;

Fig. 16 shows circuit details of the connector circuit, and

Figure 19:
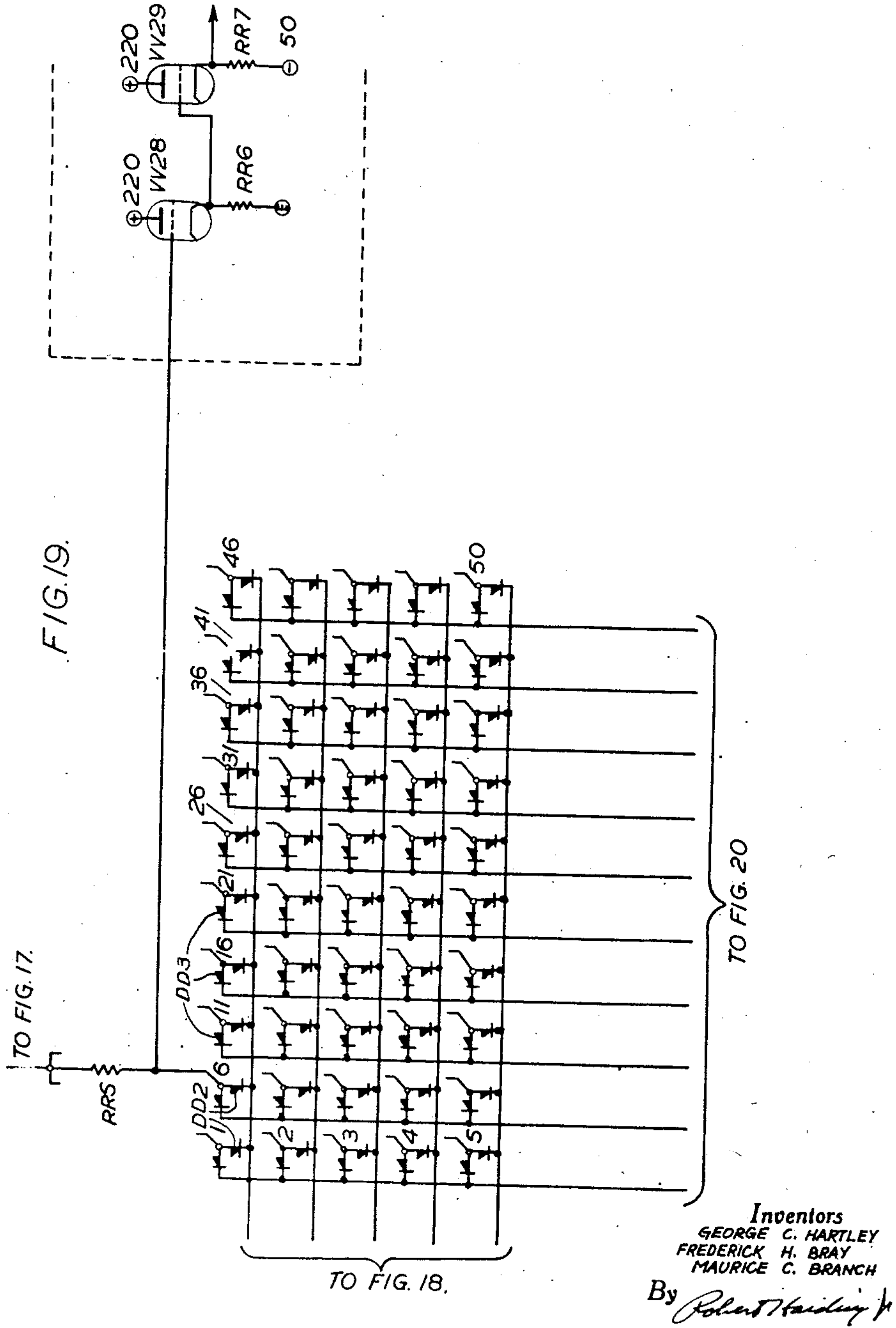
Figure 20:
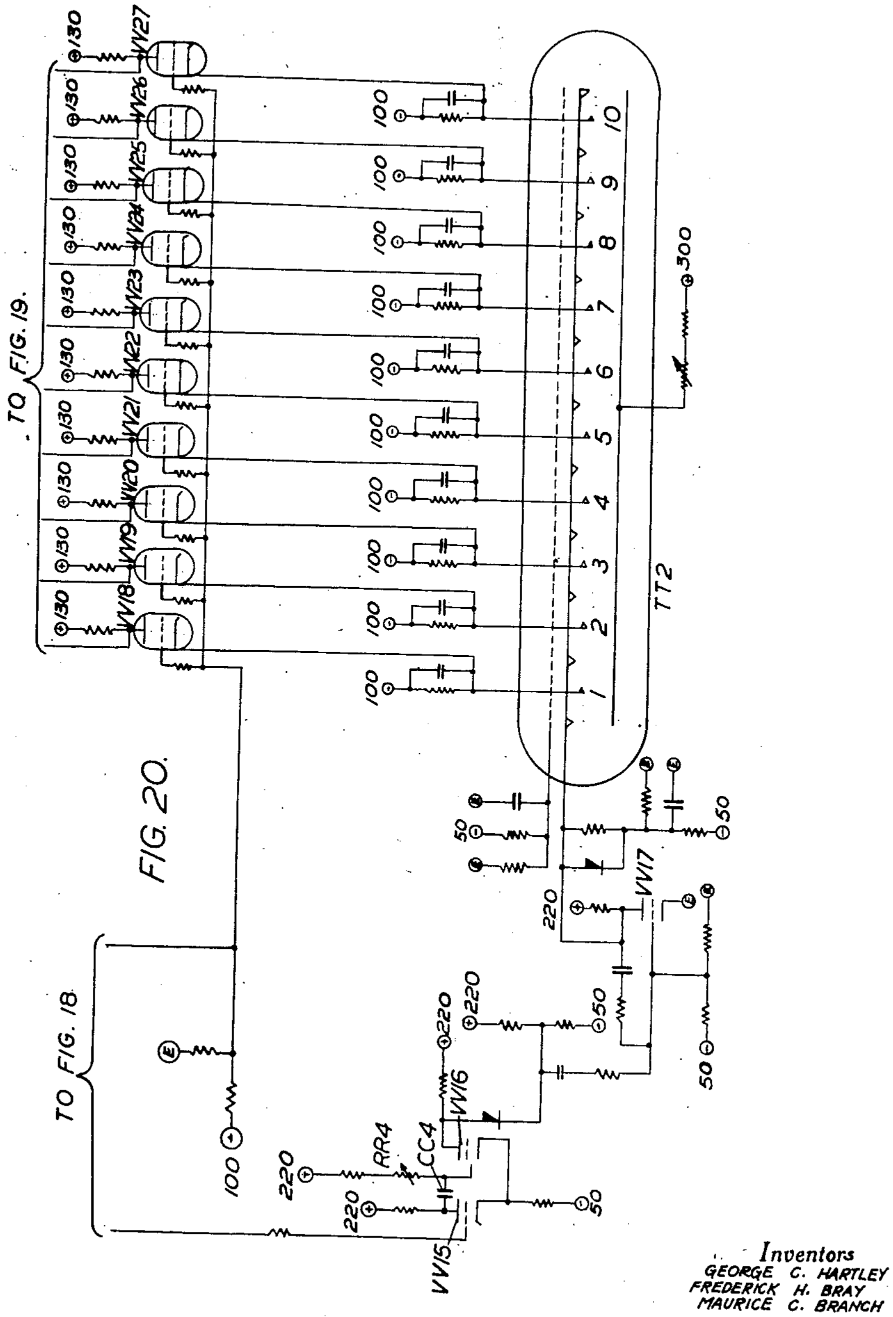
Figures 17, 18, 19, 20, 21:
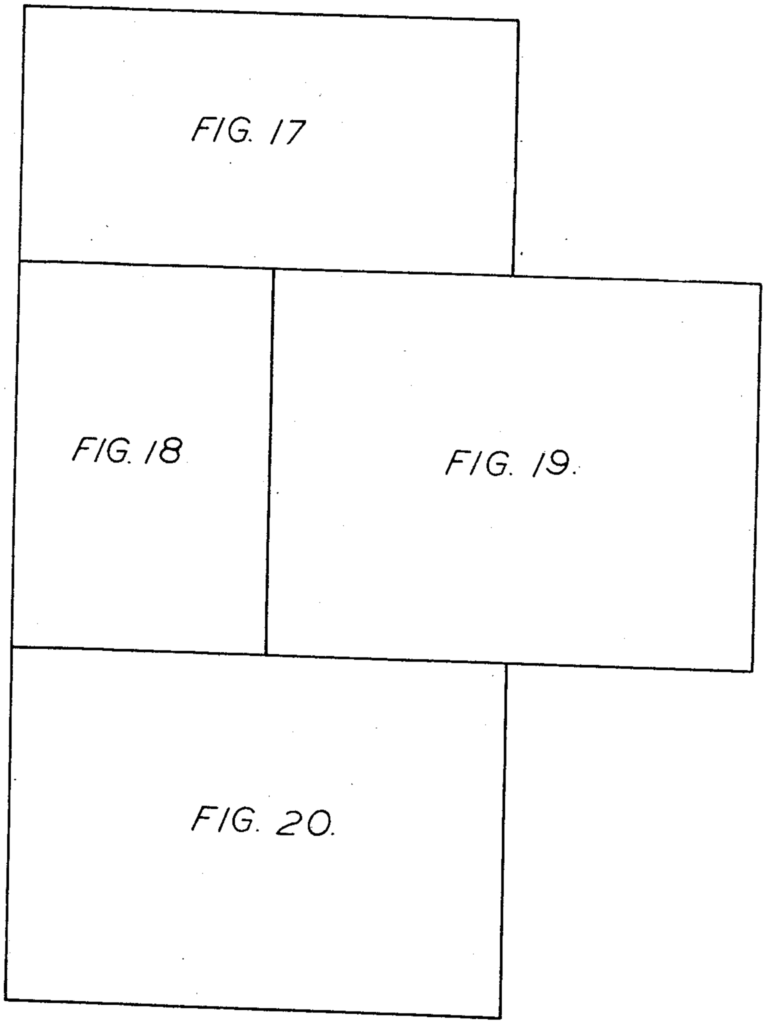

Figs. 17–20 assembled together as shown in Fig. 21 show the marker pulse circuit which supplies pulses in timed relationship to the register, translator and connector circuits.

Figure 1:
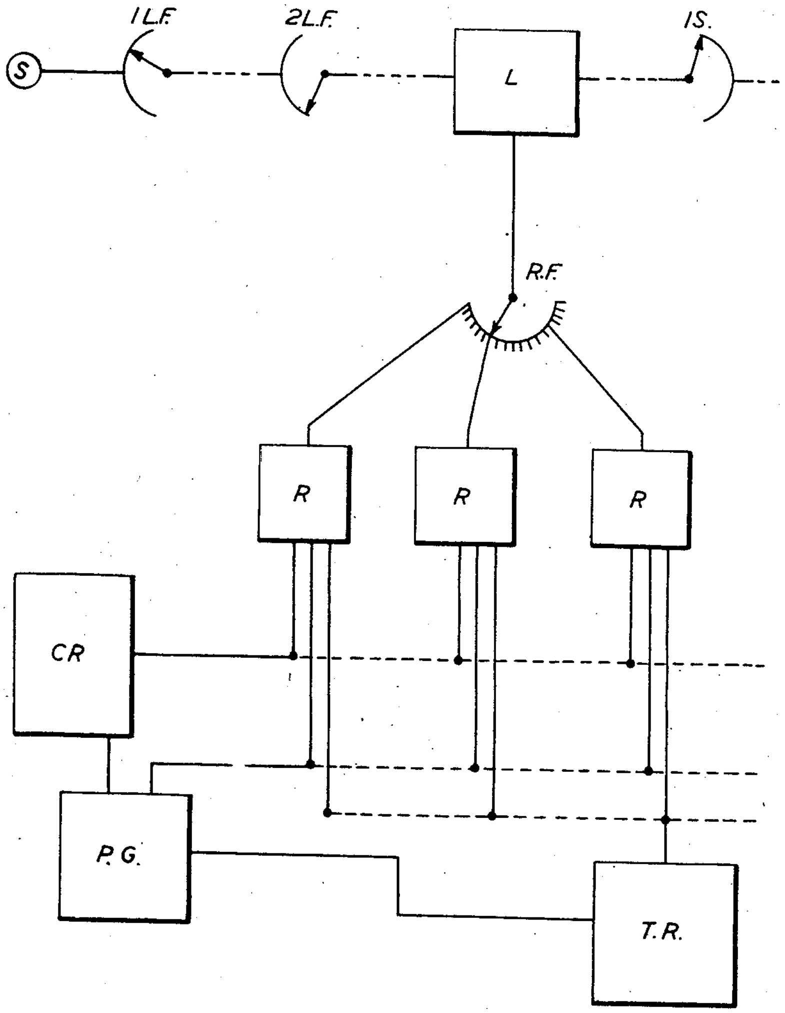
Fig. 1 is a block schematic diagram of part of a telephone exchange system employing the invention.

Referring first to Fig. 1 a calling subscriber S is connected in known manner over first and second line finders 1LF and 2LF to an idle link circuit L which in turn is connected over a register finder RF.

As will be later described in detail, the register R is, at an appropriate time, connected by means of a common connecting circuit CR to a common translator TR under the control of a train of pulses produced by a common pulse generator PG which also initiates and controls transmission of the office code digits from the register to the translator and the routing digits from the translator to the register, after which the translator and the connecting circuit are released for use by another call while the register transmits the routing and numerical digits to set up the call required by the subscriber S.

Before describing the operation of the register and translator in greater detail the function and operation of the pulse generator PG will be described with reference to Figs. 17 and 20.

*The pulse generator circuit*

Figure 17:
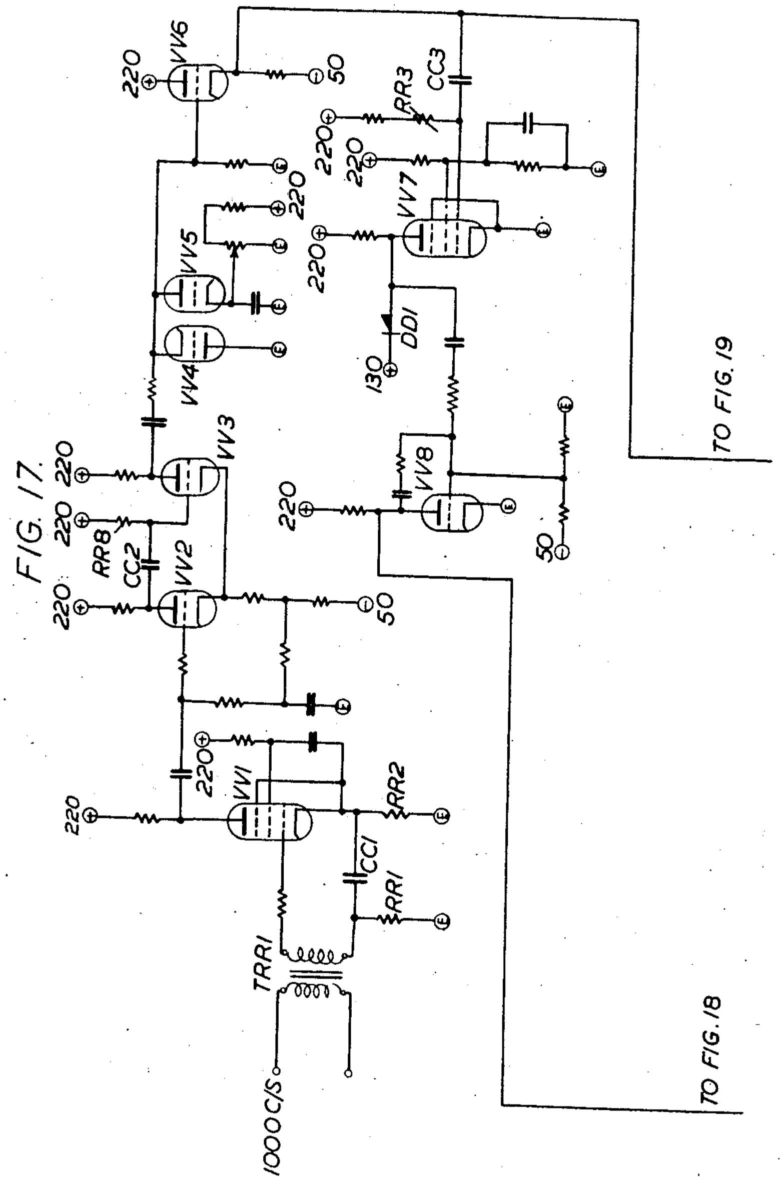

A 1000 cycles sinusoidal wave form is connected to the primary of TRR1 isolating transformer Fig. 17. The output of the secondary is applied to the grid of the amplifying valve VV1, resistances RR1, RR2 and condenser CC1 providing cathode bias for the valve in well known manner. The amplified sine wave now approximately 100 volts amplitude, is fed to the squaring circuit of VV2 and VV3. Assuming now that VV2 is off and VV3 is on, the grid of VV2 is driven positive by the VV1 anode wave form and the valve VV2 is "driven on," that is to say, it is caused to conduct, the cathodes of both VV1 and VV2 rise positive, CC2 also driving the grid of VV3 negative and VV3 thus "cuts off," that is to say, it stops conducting. The time constant of resistance RR3 and condenser CC2 is long compared to ½ millisecond so that there is little change in the grid potential of VV3 before the anode of VV1 becomes negative and cuts off VV2. The common cathode potential of VV2 and VV3 drops, the grid of VV3 is driven positive via CC2 and VV3 conducts. The pair VV2 and VV3 thus conduct alternately, the positive feedback of the common cathode load giving a very sharp rise and fall to the output voltage as is well known. From the anode of VV3 a square wave form of approximately 130 volts amplitude, 50–50 ratio, 1000 I. P. S. is fed to a cathode follower VV6. Diodes VV4 and VV5 hold the pulse applied to the grid of VV6 between earth and approximately positive 120 volts and the output of VV6 is thus a square wave form, 50–50 ratio, 1000 I. P. S. positive 120 volts, with its base at approximately earth potential.

Figure 18:
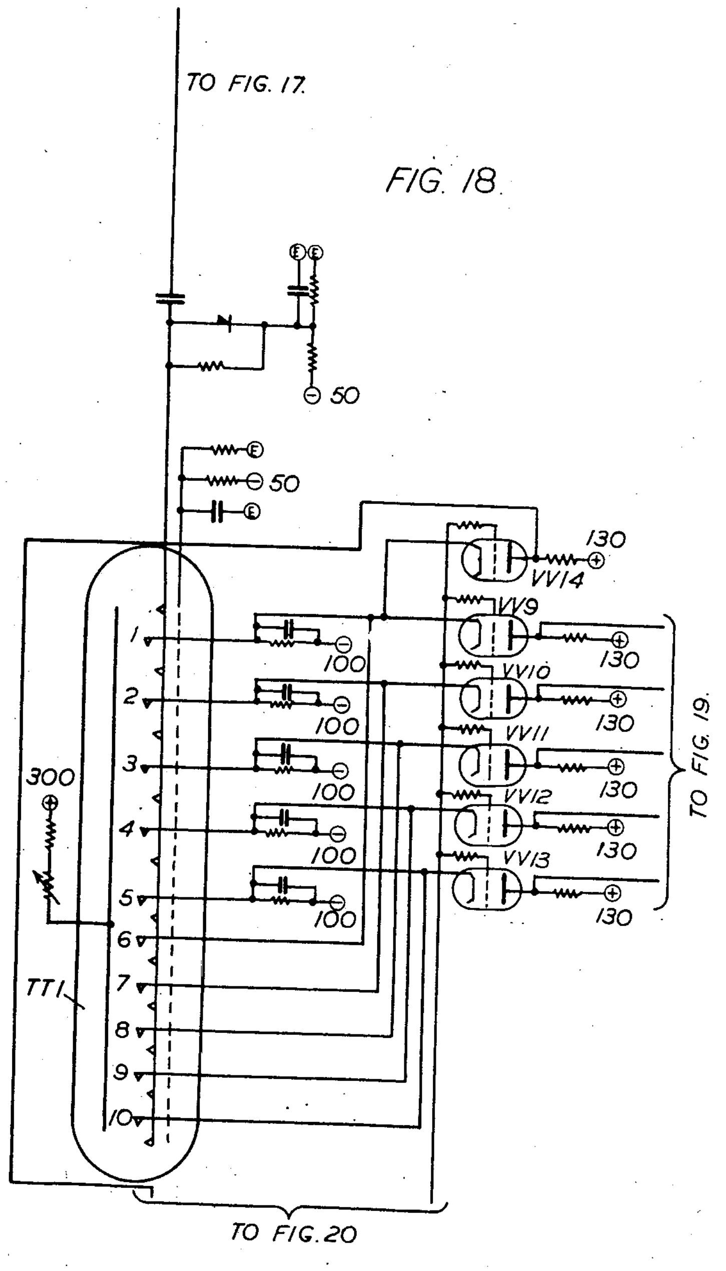

The valve VV7 produces a 20–30 microsecond pulse every time the wave form from VV6 moves negative. The grid of VV7 is normally held at its cathode potential via resistance RR3 and VV7 therefore conducts, but the negative waveform of VV6 drives the grid negative and cuts off VV7. CC3 charges positive through RR3 and drive VV7 on again in 20–30 microseconds. Thus a positive pulse is produced at the anode of VV7. This pulse is caught at positive 130 volts by rectifier DD1 and fed to the anode follower valve VV8. VV8 is an amplifier valve with voltage negative feed-back, having a gain of approximately 1 but a low output impedance. The negative pulse is thus fed from a low impedance source to the counter tube TT1 (Fig. 18).

This tube TT1 (and also TT2) is a known type of multicathode cold cathode gaseous discharge tube having a number of discharge gaps, each comprising a different cathode and which fire in succession in a predetermined order, on application of negative pulses to a common trigger cathode, the anode being connected to say positive 300 volts and each individual cathode being connected through a C-R network to say negative 100 volts.

The counter tube TT1 counts the pulses which are produced from VV8 every millisecond in known manner, the cathodes conducting in sequence. Since the first cathode is connected to the sixth, the second to the seventh, the third to the eighth, the fourth to the ninth and the fifth to the tenth, a pulse 1 millisecond wide occurs on each cathode every fifth pulse. These pulses drive the cathodes of the amplifier valves, VV9–13 from negative 100 volts to negative 60 volts and since their grids are connected to negative 90 volts the valves which are normally conducting cut off in sequence and a positive pulse 1 millisecond wide is produced on their anodes.

Every time the first cathode TT1 conducts it cuts off VV14 as well as VV9 and the amplified positive pulse passes to the pulse producing flip-flop pair VV15 and 16 (Figs. 20). The circuit of these valves is similar to the VV2, VV3 circuit except that the time constant of RR4 and CC4 is short compared to the repetition rate of the wave form on the grid of VV15 thus when VV15 is driven on, VV14 cutting off, VV16 cuts off but conducts when CC4 has charged through RR4 to a sufficient potential. VV16 conducting again cuts off VV15 due to the coupling of the common cathode resistor. From the comparatively sloping waveform on the grid of VV15 a sharp fronted negative pulse 20–30 microseconds wide is produced and fed via anode follower VV17 (Fig. 20) (similar to VV8) to drive the counter tube TT2. TT2 thus counts every fifth pulse produced by VV6, the cathodes of TT2 conducting in sequence 1 to 10. The potential produced from the cathode is amplified by valves VV18 to 27 operating in exactly the same way as the valves VV9 to 13. Each of the valves VV18 to 27 is thus cut off in turn for 5 milliseconds and during each five milliseconds each of the valves VV9 to 13 cuts off in turn for 1 millisecond. By combining the two conditions a pulse is produced in turn on 50 separate leads.

In Fig. 19 these leads are shown numbered 1 to 50. There are also five horizontal leads coming from the tubes VV9 to VV13 of Fig. 18 and ten vertical leads coming from the tubes VV18 to VV27 of Fig. 20. Each of the leads 1 to 50 is connected to one of the horizontal leads via a rectifier DD2 and to one of the vertical leads via a rectifier DD3. Each of the leads 1 to 50 also has an associated circuit having two tubes VV28 and VV29 and a resistance RR5, the lead being connected to the grid of the tube 28 and to one end of the resistance RR5. The other ends of all the resistances RR5 are brought to a common point, as indicated, and this point is connected to the 1000 I. P. S. output of VV6, shown in Fig. 17. The tubes VV28 and VV29 and the resistance RR5 connected to lead 6 are shown in Fig. 19. So long as either VV9 or VV19 is conducting, one of the rectifiers DD2 and DD3 conducts and the whole pulse voltage from VV6 is dropped across resistance RR5 connected to lead 6, no voltage change appearing on the grid of VV28, but if both VV9 and VV19 are non-conducting, rectifiers DD2 and DD3 have positive 130 volts on their positive ends and they do not conduct and the pulse from valve VV6 passes via resistance RR5 to the grid of valve VV28. The cathode follower VV28 feeds the pulse to a second cathode follower VV29 which is connected to one of the main pulses leads P1–P50 to the register translator. The resistance RR6 is high and permits the output voltage of VV28 to be large. Valve VV29 always feeds into a low impedance i. e. the load on the pulse leads to the register translator, so that the value of RR7 is unimportant and valve VV28 is arranged to force VV29 to take grid current and thus produce an output pulse of greater amplitude than is possible when no grid current is taken. Valve VV28 cannot take grid current because of the high resistance of RR5.

Since valve circuits similar to VV28 and VV29 are connected to the other 49 mixed pulse circuits, a distribution of ½ millisecond, positive 100 volts, pulses over the 50 leads in turn is achieved together with a low output impedance suitable for connection to a large number of register circuits.

In addition to supplying the scanning control pulses the fifty pulse outputs (P1 to P50) so formed are used to control the operation of the translator and the registers, as will appear from the succeeding description.

Figure 2:
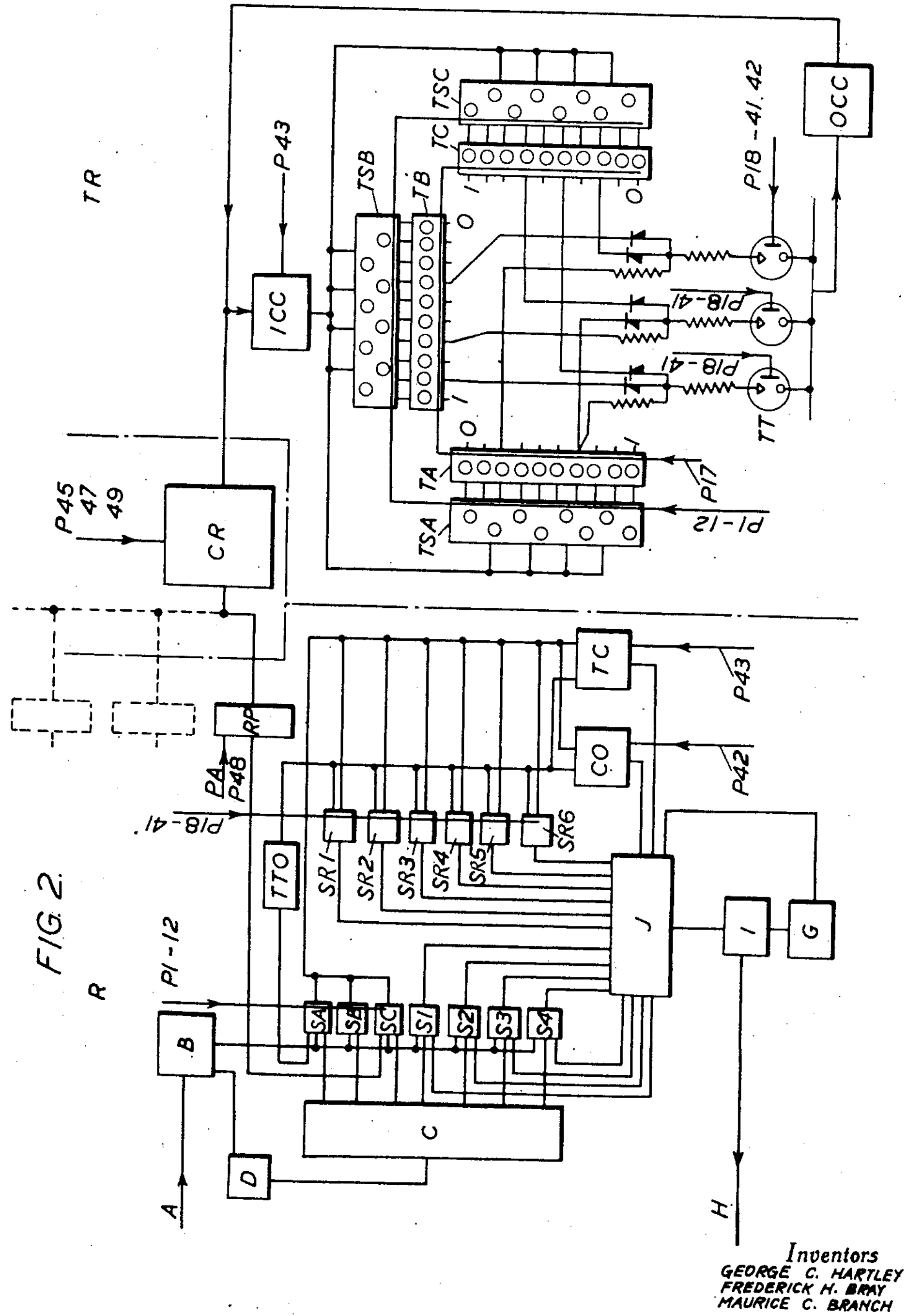
Fig. 2 is a block schematic diagram of a register circuit, and a connector circuit by which a plurality of registers obtain access to the translator.

Turning now to Fig. 2, the left hand portion R of the figure, shown in block schematic, represents a register arranged to receive three office code digits followed by four numerical digits.

Operation of the calling sender at a subscriber's station produces, in known manner, trains of impulses or other signals on the incoming pulse lead A.

Each signal train of impulses is received in succession on a receiving device B suitable to the type of signals or impulses to be received. For instance, where the subscriber's sender comprises an impulse dial which produces trains of impulses containing numbers of impulses dependent on the digit dialled, the receiving device B may conveniently be a binary counting chain comprising four pairs of cold cathode tubes in known manner.

At the end of each train of impulses or other signal denoting one digit a digit distributor C in conjunction with an end-of-digit detector device D causes each successive setting of the receiver B to be passed successively to static electrical switches such as storage groups SA, SB, SC, S1, S2, S3 and S4 which may each be binary storage groups as will be later described. Seven such storage groups are shown on the drawings, groups SA, SB, SC, being for a three digit (or letters) office code and S1, S2, and S3 and S4 for a four digit office number.

Consider first a normal call in which the subscriber correctly dials or sends all seven digits. When the digits indicative of the office code have been received, i. e. when SA, SB and SC are set, the register by means of its allotted pulse PA is connected through its connecting group RP to the connector circuit CR. The pulse PA is one of the fifty pulse outputs produced by the pulse generator. One of these fifty outputs is individual to each register in the system. When the translator TR (shown in block schematic on the right hand portion of Fig. 2) is free, pulses P48 and P49 from the register and connector respectively cause it to be connected to the register, and pulses P1–12 is applied, one each, to the anodes of the twelve tubes comprisilg SA, SB, SC, transfer over one wire through RP, CR, and an appropriate control circuit 1CC on the translator, the individual conditions of these tubes to storage groups TSA, TSB, TSC in the translator which may each be arranged also to store on a binary basis and to mark one of ten wires on a decimal basis according to the digit stored. The ten wires from the storage group TSA are connected to control electrodes of ten cold cathode tubes comprising decimal storage TA. Similarly the wires from TSB and TSC are connected respectively to TB and TC.

When anode voltage is applied to the tubes in TA, TB, and TC by the application of pulse 17 to a suitable gating device the appropriate tube in each of the groups is fired, thus registering in the translator the digits of the three letter code which was recorded in the register. The cathodes of the three groups TA, TB, and TC may be connected together, one from each group, to one thousand points, each set of connections differing from all others. Each of the thousand points is thus indicative of a different possible office code. The various connections from the groups TA, TB, and TC are made through suitable individual resistance and rectifier networks, so that the trigger cathode of a tube TT connected to any one of the points will receive a firing potential only when the point to which it is connected is energised simultaneously by all three groups TA, TB, and TC. Three such tubes TT are shown in the drawing for the three office codes HAM (426) and HIG (444) and TRU (878). Thus the three digits received from the register, indicative of the office code, result in the selection of a particular one of the tubes TT, a different one of which would be selected by each different office code.

Connected to the anodes of each of the tubes TT is a pattern of the pulses P18–41, each pattern being indicative of the binary codes of the digits of the translation for the particuluar code which caused the tube to be selected.

When a tube TT conducts, the pulses on the anode thereof appear at the cathode. Only the selected tube TT is in conducting condition and the pattern of pulses appearing at the cathode thereof is fed in suitable manner through the control circuit 8CC and over the one wire through the connecting circuit CR to the translation storage groups ST1 . . . ST6 of the register.

A further pulse P42 may be sent from the translator for those tubes which are selected by code only codes such as TRU to actuate a device CO in the register, thereby indicating that the translation will not be followed by numerical digits. Such "code only" codes are not followed by numerical digits. Tubes specifically intended for such codes are not shown. The device CO will be fully described in the ensuing specific description. A pulse P43 is sent by the translator to the register to actuate a device TC in the register, thereby indicating that the register has received the full translation. Pulse P43 may also cause disconnection of the anode supply to decimal storage groups TA, TB, and TC and may cause release of the translator from the register.

The translator TR may now be released from the register for instance by the application of pulse P45 in the connector circuit CR and may now be made available for use with another register by the application of P47.

The register having received pulse P43 now proceeds to transmit trains of impulses, first according to the digits stored in SR1–SR6 and then according to the digits stored in S1–S4. For this purpose, a continuous train of impulses from a pulse source G is applied to the outgoing pulse lead H through a sending device I, which may be a binary counting train, and which controls the number of pulses admitted to the lead H in accordance with the digits stored in SR1–S4, introducing a suitable inter-digital pause between digits, all under the control of a distributor J.

As soon as the last train of impulses has been sent the register may be released.

Special codes such as for instance, the single letter "O" for "operator," may be handled by the register without the translator functioning on the call at all. The setting of storage group SA to 10 when the first received digit consists of ten impulses, i. e. when it is "O" which occurs only on calls for "operator," causes the operation of a translation group TTO, in the register, which may comprise a tube similar to the tubes TT in the translator and which supplies a suitable translation to the storage groups ST1–ST6. In this manner "O" calls may be independent of the translator.

Alternative trunking, which principle is well known, may be provided in simple manner. For instance, the anodes of the tubes TT in the translator may have connected to them a pattern of pulses P18–41 representing the translation of the called exchange designation digits used when the call is routed in the normal manner followed by a further translation representing an alternative routing for the call. The storage groups SR1–SR6 will store, both the sets of digits, say SR1–SR3 storing the digits required for normal routing and SR4–SR6 the digits for the alternative route.

When the register, during the sending out of the normal routing digits, receives back indication that alternative routing digits, are now required, which indication may conveniently be line reversal, the digit distribution train J in the register operates to prevent any of the digits of SR1–SR3 which have not yet been sent out, from being sent and instead arranges the sending of digits SR4–SR6, which are not normally sent, before transmission of the numerical digits from storage groups S1 . . . S4.

The circuits shown in detail in Figs. 3–16 will now be described.

The register is seized in known manner by the first code selector link circuit and relay AE (Fig. 3) is operated. Tube T1 is normally conducting and its trigger is held positive by the charge on the condenser C1. Relay AE operates to connect the positive 130 volts at *ae1* to the trigger of tube T3 and fire the tube. Condenser C1 is discharged to approximately —30 v.; after a delay of a few milliseconds, due to resistance R1 condenser C2, tube T2 fires from the same source as T3 and relay BE operates. The cathode of T1 is held at a positive voltage by the resistance R2 and condenser C3 while its anode voltage is reduced to +20 v. by the increased drop across R99 due to the firing of T2. With this reduced voltage across its anode/cathode gap the tube extinguishes. When relay AE impulses, T3 is extinguished by the opening of *ae1* and condenser C1 is charged slowly through R3, but discharged rapidly through T3 when *ae1* closes, refiring T3. Thus T1 is not fired unless the release of relay AE is longer than is normal during impulsing. It can thus be seen that Fig. 3A (shown in dotted lines and including the tubes T, T2, T3), produces the equivalent of the B relay, familiar in telephone impulsing circuits.

As an alternative to Fig. 3A the B relay may be emulated by Fig. 3B. Valve V1 is normally non-conducting; when *ae1* contact closes, condenser C4 is charged rapidly and V1 conducts, operating relay BE. During the impulsing of AE, C4 is discharged slowly via resistance R4 then charged rapidly via rectifier D1, and thus V1 is held conducting unless the release time of AE exceeds the normal impulse break time. Of course, if the arrangement of Fig. 3A is used, the arrangement of Fig. 3B is omitted. and vice versa.

The equivalent of the normal C relay is obtained by the tube T4 circuit. Condenser C5 is charged slowly via resistance R5, when contact *ae1* operates and discharges rapidly via rectifier D2 when contact *ae1* releases. Thus on the initial operation of AE, T4 fires, and pulses P14 and P24 connected to its anode appear at the cathode, but on the first release of the *ae1* contact C5 discharges and T4 extinguishes, and the pulses P14 and P24 are blocked. Condenser C5 does not charge sufficiently during the make periods of the AE relay impulsing to fire T4, and T4 re-fires only when the AE relay finally closes its contacts at the end of the train of impulses, and P14 and P24 are once more gated, to the cathode of T4. Condenser C22 and resistance R91 pass a percentage of the potential of P14 and P24 pulses to resistance R92 thence to the trigger of T4 to ensure that T4 does not fire midway through a pulse, but only before the arrival of a pulse.

The operation of relay BE, either using Fig. 3A or Fig. 3B, connects dial tone over *be1* to the lead FR in the usual manner and connects +*ve* 130 v. over *be2* to certain parts of the circuit as will be later mentioned. *be3* changes the condition on the P lead and *be4* and 5 prepare the time pulsing out circuit. T5 (Fig. 5) is fired by the application of 13° v. to the anode via contact *be2*.

Tube T5 firing produces a pulse to fire tubes T120, T123 (Fig. 5), T109 (Fig. 9), T7 (Fig. 3), T33 (Fig. 6), and thus set the circuit in the correct condition for operation. This prevents a temporary failure of the power supply destroying the correct sequence of the circuit.

The pulse P24 from the cathode of T4 (Fig. 3), fires tube T6 which is already biassed from the cathode of T7 in the fired condition, and P24 connected to the anode of T6, appears at the cathode and passes via rectifiers D3 to D6, to fire tubes T10, T12, T14 (not shown), T16 (not shown), thus setting the binary counting train at zero.

Relay AE responds to the incoming digits over the PU lead and its release blocks the P24 pulse, as already described, and the next make of the *ae1* contact produces a positive direction 50 v. pulse in the network R6, R7, C6, R8, D7; R6 controls the bottom limits of the pulse at negative 100 v.; R7 and C6 mask the bounce on the *ae1* contact; and R8 and D7 hold the top limit of the pulse at negative 50 v. This 50 v. pulse is fed to the binary pair T10 and T11, and fires T11; T10 is already fired. T11 firing reduces the anode of T10 to 60 v. below its maintaining voltage and the tube is extinguished.

The second release of *ae1* contact has no effect. The second make again produces a positive 50 v. pulse, and this time T10 fires, T11 being extinguished. The pulse is also applied through C7 to the network R9, D8, R10, C8, R11; while T10 was extinguished, C7 charged to positive 80 v. through R9 and when a 50 v. pulse is applied to C7 the rectifier D8 conducts and the pulse produced across R10, passes via C8 to R11 to fire T13; T12 is extinguished in the same way as T10. Neither of the condensers C9 and C10 are charged at the time of this last-mentioned pulse because of the fact that T12 and T14 are conducting and the potential on their anodes and therefore on the right hand sides of condensers C9 and C10 is reduced. Therefore the pulse has no effect on tube-pairs T14, T15 and T16, T17.

The third pulse on the make of *ae1* contact fires T11 and extinguishes T10 but does not affect the T12 and T13 pair, because now C7 is prevented from being charged positively because T10 was conducting before the pulse, and a positive 50 v. pulse is not sufficient to make rectifier D8 conduct, its positive end being at +80 v. The pair of tubes T14 and T15 are not affected by the pulse because C9 is not charged positively also because of the former operation of T10.

The pair of tubes T16 and T17 are not affected by the pulse, because C10 is prevented from charging to +*ve* 80 v., via R14 and R15 by rectifiers D9, D12 and D11, holding the potential to the negative 30 v. on the anodes of the conducting tubes T10 and T14.

In a similar manner to that described above, the fourth pulse fires T10, T12 and T15 and the four pairs of tubes T10 and T17 continue to count incoming pulses from the *ae1* contact. When the first digit is complete, it is recorded in binary form on the four pairs of tubes T10 to T17. The tubes T11 and T13, T15, T17, conducting, can be considered as one in binary and when non-conducting as nought, for example:

Seven incoming pulses will set the train with tubes T11, T13, T15 fired. thus representing 0111, the binary notation for 7.

Figure 3:
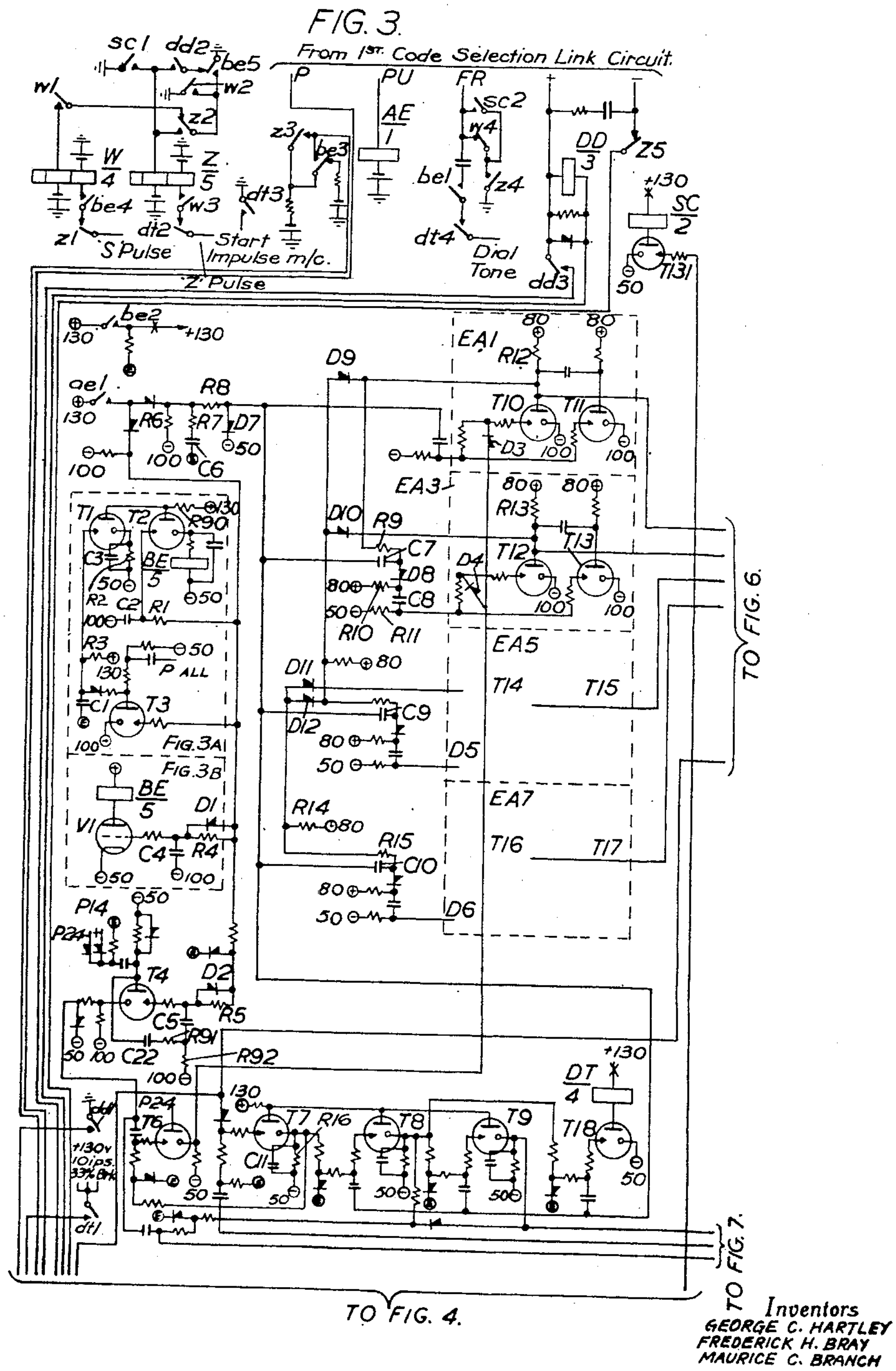

Now the first pulse produced by the incoming digit is also fed to the counting train T8, T9, T18 (Fig. 3). The primary purpose of this counting train is to reject a first incoming digit of 1. T7 is normally fired and T8, T9 and T18 extinguished. The tube T8 is biassed from the cathode of T7 and the first pulse adds to this bias to fire tube T8. T9 does not fire because it is not biassed. T8 firing reduces the voltage on the anode T7 to positive 20 v.; the condenser and resistance T11 and R16 hold the cathode of T7 to positive 20 v. and the tube T7 is, therefore, extinguished. The extinction of T7 maintains the blocking of the pulse P24 by tube T8. If the digit is 1, tube T4 conducts at the end of the digit as already described, and pulse P14 appears at the cathode of T4 and fires T19 (Fig. 7) biassed from T8. T19 conducts the pulse P14 connected to its anode to T20 where it is added to the existing bias and T20 in the same way as T19, conducts P14 to its cathode. Pulse P14 on the cathode of T20 re-fires T7, and T8 is extinguished as previously described. T21 (Fig. 7) is not fired, because it is not biassed from T9. The tubes T4, T19 and T20 extinguish at the end of pulse P14. When pulse P24 arrives it is also conducted by T4 to its cathode and is repeated by T6 in the same way as T19 repeated P14. The pulse P24 from the cathode of T6 is applied via rectifiers D3–6 to reset the counting train T10–T17. Digit 1 is thus rejected and the circuit is ready to accept the next digit. If the digit is two or more, T9 is fired by the second closure of the *ae1* contact and when T4 gates P14 at the end of the digit, the action already described takes place and this time T21 (Fig. 7) is fired, it having been already biassed from T9 (Fig. 3) and having had its anode connected to +130 volts over *be2* (Fig. 3). T18 is fired in parallel with T9 and DT relay (connected to +130 volts through *be2*) operates. DT relay performs the usual operations of disconnection of dial tone and starting the impulse machine. The operation of *dt1* contact (Fig. 3), connects a 10 impulse per second pulse circuit in preparation for sending the outgoing digits.

Figure 6:
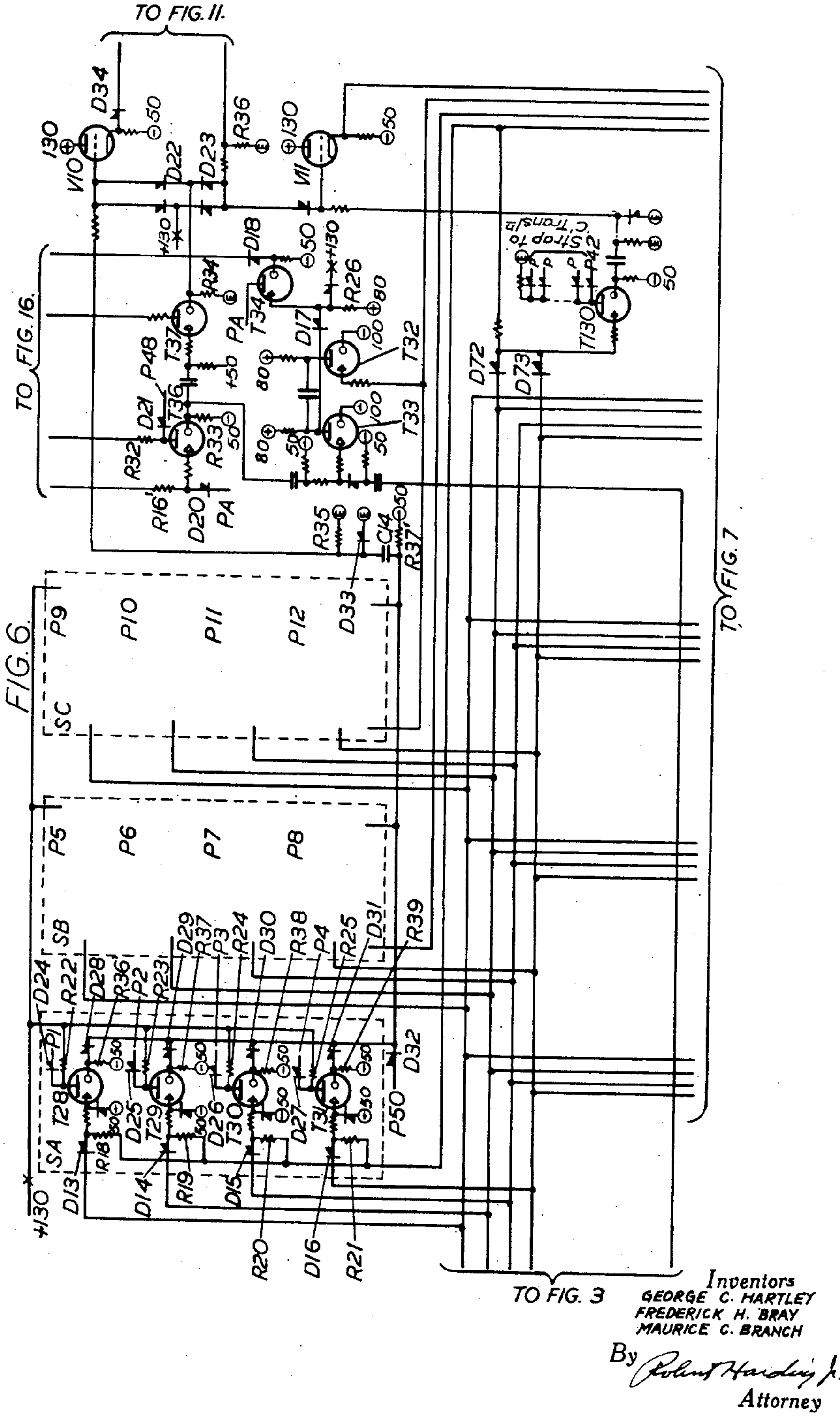

Tube T21 (Fig. 7) firing produces a pulse across resistance R17. This pulse is connected via high resistances R18 to R21 to the triggers of storage tubes T28 to T31 (Fig. 6). If any of the tubes T10, T12, T14 and T16 are conducting the rectifiers D13 to D16 drain the pulses through the tubes so that they do not appear on the respective triggers of T28–T31. If any of the tubes T10, T12, T14, T16 are not conducting, the rectifiers do not conduct, having positive 80 volts on their positive ends, and the pulses appear at the triggers of the corresponding tubes T28–T31 and these tubes fire and maintain via their anode resistances R22–R25 to positive 130 volts over *be2* (Fig. 3). The binary pattern previously stored on T11, T13, T15, T17 is now stored on tubes T28 to T31. This transfer of information takes place at the time of pulse P14 and ten milliseconds later P24 is gated through T4 and T6 to reset the binary counting train T10 to T17 as described earlier. The circuit is now ready to receive the second digit. The circuit functions exactly as described for the first digit, except that the digit 1 is not rejected.

Tubes T21–T27 form the incoming digit distribution train. As already described T21 when biassed from T9 admits the first digit into storage unit SA (Fig. 6) and the firing of T22 admits the second digit into storage unit SB, but since T22 is biassed from T21 the digit 1 will not be rejected. At the end of the third incoming digit tube T23 is fired and the digit is transferred to the storage unit SC; the remaining incoming digits are received and stored on the groups of storage tubes S1, S2, S3 and S4 (Fig. 7) the anodes of which are connected to +130 volts through *be2* (Fig. 3), the firing of the incoming distribution train T21 to T27 moving along at the end of every incoming digit, each tube priming the next one in the train but not extinguishing the previous one, so that, when all seven digits have been received, all the Tubes T21 to T27 are fired.

At the end of the third incoming digit, T23 (Fig. 7) fires and the pulse produced, as well as transferring the digits stored on T10 to T17 tubes to the storage unit SC, fires tube T32 (Fig. 6). T32 firing reduces the anode voltage of T33 and this tube is extinguished. The rectifier D17 no longer conducts, and positive 80 volts is applied to the trigger of T34 via R26. T34 has connected to its anode one of the series of pulses P1 to P48, one pulse PA being allotted to each register in the system, and when positive 80 volts is applied to the trigger, the pulse on the anode of T34 appears at the cathode and is connected via rectifier D18 to the connector circuit, Fig. 16.

The pulse drives the cathode of valve V2 (Fig. 16), which is normally conducting, positive, and since T35 is non-conducting the pulse cuts off V2. The resultant positive pulse on its anode is fed through the cathode followers V3 and V4 to 48 networks, similar to R27, D18′, R28, C11′, D19, R29, C12, it being assumed that there are 48 registers.

The 48 rectifiers D18′ of the 48 networks are connected each to a different pulse of the series of P1 to P48. The pulse PA from any one register, passing via V2, V3 and V4, therefore appears on only one network R28, C11′, the other D18′ rectifiers preventing it from appearing from all other networks. The purpose of these networks is to ensure that a faulty register which continues to send its calling impulse after connection to the translator, cannot prevent other registers from seizing the translator. The pulse PA passes via C11′ and D19 to appear across R29 and thus through C12 to the grid of V5 which is common to all networks. It will be seen later that the pulse PA from the register would normally appear only once on C11′, but it is possible for a fault condition in a register to result in pulses appearing every 50 milliseconds and by so appearing, prevent all other registers with a higher allotted PA pulse from connecting to the translator. If such a fault develops, the condenser C11′ of the particular network associated with the faulty register charges up and is prevented by D19 from discharging, except via the high resistance R28, so that the pulses repeated at 50 milliseconds intervals are blocked by the charge on C11′ and do not appear on valve V5. In normal conditions C11 discharges via R28 long before a register makes a second call.

The pulse PA is distorted by passing through the network C11′, R28, and is re-shaped by valves V5 and 6. V6 is normally conducting and V5 non-conducting. The positive pulse from C12 “drives V5 on” (that is to say, causes it to conduct as opposed to “cutting off,” which means stopping the valve conducting), and the resultant negative pulse on the anode of valve V5 cuts V6 off. The condenser C13 charges slowly via resistance R31, and in approximately half a millisecond V6 is driven on again, the cathode of V5 goes positive and V5 cuts off. The valve V6 has thus conducted for half a millisecond and a positive half millisecond pulse is produced on its anode. This pulse is fed via a cathode follower valve V7 on to a lead L common to all registers and at the same time T35 (Fig. 16) is fired.

T35 firing, maintains itself to the positive 130 volts normally delivered by the cathode follower valve V8 and drives the grid of V2 positive, thus holding V2 conducting even when a positive pulse is applied to its cathode thereby preventing the calling pulse from the other registers passing to V3.

The pulse sent to all registers on lead L is accepted only by the register whose pulse PA it is. The resistance R16′ and rectifier D20 (Fig. 6) prevent all but the correct pulse from firing T36. T36 when fired maintains the positive 130 volts normally supplied from the cathode follower valve V8 (Fig. 16) via its anode resistance R32. The potential across the cathode resistance R33 is small because R33 is small compared with R32. The pulse P48 is connected to the anode via D21 and if T36 is fired, when pulse P48 arrives it appears across the cathode resistance R33, since the forward resistance of rectifier D21 is low compared to R33. The pulse P48 across R33 fires tubes T33 and T37. T33 extinguishes T32 and rectifier D17 conducts, and by extinguishing T34 stops the call pulse PA of the register going to the connector circuit, Fig. 16. T37 firing, maintains the cathode follower V9 (Fig. 16) and the voltage rises across the resistor R34, rectifiers D22 and D23 no longer conducting, and a signal on the lead from R35 can appear at the grid of V10 and a signal across R36 on the grid of V11.

The valves B12 and B13 (Fig. 16) form a hard valve binary pair, only one conducting at a time. B13 is normally conducting, but P49 drives the grid of B12 positive, and B12 conducts, the anode of B12 falls to +20 volts and the potential on the grid of B13 becomes negative and B13 is cut off. Pulse P1 drives B13 on again and B12 is cut off, thus a negative pulse 1 millisecond long, is produced at the anode of B12; this pulse is repeated via a cathode follower valve V8, and the anode volts supplied to tubes T36 (Fig. 6) drops below earth potential for 1 millisecond and T36 (Fig. 6) and T35 (Fig. 16) are extinguished. The connector circuit has now connected the register to the translator.

The first three incoming digits have already been stored in binary form on units SA, SB, SC (Fig. 6). If the first digit was 7, tubes T28, T29 and T30 are fired and maintain via the anode resistors R22 to R24 to the positive 130 volts. The cathode resistors R36' to R38 are small compared to the anode resistors R22 and R24 and the cathode voltage on T28 to T29 is thus still approximately negative 50 volts. To the anodes of the tubes T28 to T31, are connected respectively pulses P1 to P4 via rectifiers D24 to D27; when P1 arrives, T28 is conducting and, therefore, the pulse P1 appears across the cathode resistance R36', D24, being a low impedance compared to R36'. Similarly P2 and P3 appear across R37 and R38 but when P4 arrives, since T31 is not conducting, no signal appears on the cathode resistance R39. The pulses P1 to P3 are then fed via rectifiers D28 to D30 to resistance R37'. In a similar manner using pulses P5 to P8 and P9 to P12, the storage units SB and SC feed a train of pulses representing the second and third incoming digits in binary form to resistance R37'. Pulse P50 is also connected to R37' via D32. Therefore, across R37' there is a train of half millisecond pulses spaced in time to represent the first three incoming digits in binary form. These impulses pass through C14, are restored to D. C. earth level by D33 and R35 and pass to the grid of cathode follower V10.

Figure 11:
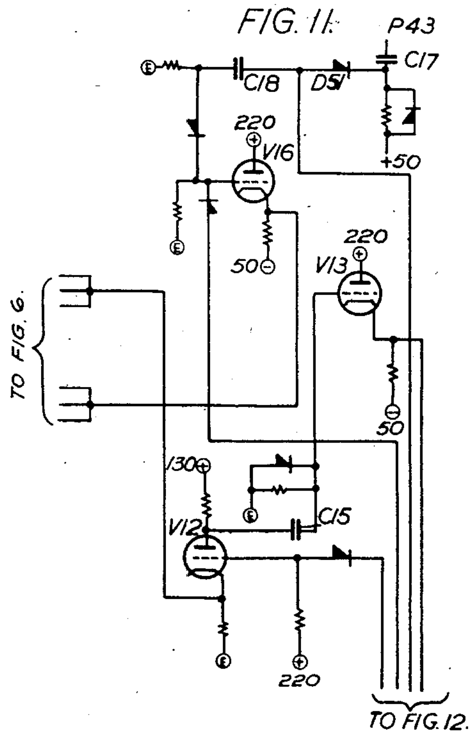

The cathode of V10 is connected via decoupling rectifier D34 to a common lead connected to the translator Fig. 11. The pulse train drives the cathode of V12 (Fig. 11) and the pulses appear amplified and shaped at the anode of V12. They are then fed via the cathode follower V13 over leads shown in Figs. 12 and 14 and indicated at *a* in Figs. 13 and 14 to storage and decoding units TSA, TSB, TSC, Fig. 13. There are three separate circuits for the storage and decoding units TSA, TSB, TSC. Each is like the circuit of Fig. 3, except that in TSA the pulses applied to rectifiers D34 and D37 are P1 to P4, respectively, in TSB these pulses are P5 to P8, respectively, and in TSC these pulses are P9 to P12, respectively. The resistances R40 to R43 (Fig. 13) are high impedance compared to the forward resistances of D34 to D37, but low impedance compared with the reverse resistance of rectifiers D34 to D37. Thus, when the pulse train P1, P2, and P3 arrives via V13 the tubes T39, T41 and T43 are fired because both the rectifier and resistance connected to their trigger circuits are driven positive at the same time, but T45 does not fire, since the rectifier D37 does not go positive at the time of P4 and the resistance R43 thus remains at earth potential and keeps the potential of the trigger electrode of T45 substantially at earth potential. The tubes T39, T41, T43, T45 (Fig. 13) are connected as binary pairs to the tubes T38, T40, T42, T44 (Fig. 13) respectively. Normally T38, T40, T42, T44 are conducting, but when T39, T41, T43 are fired, tubes T38, T40, T42 are extinguished exactly as described earlier for tubes T16, T11 (Fig. 3). The tubes T38–T45 are thus fired in exactly the same pattern as were T10–T17 at the end of the first digit. The pulses P5 to P8 and P9 to P12 representing the second and third incoming digits set similar sets of binary pairs in storage units TSB, TSC. The first three incoming digits are now stored in binary form in translator groups TSA, TSB, TSC (see Fig. 15).

The anodes of the eight tubes T38 to 45 are connected via a resistance rectifier network to decode the binary number into a decimal one, marking one of ten leads with a positive potential. One of the ten leads connected to the anodes of T38–45 will be marked with the full positive potential applied to the network. When all the rectifiers connected to one of these ten leads are rendered non-conducting, that one lead will bear a positive output potential from the 130 volts source. As the rectifiers are connected to the anodes of tubes T38 and T45, it will be those tubes which are quiescent which block the rectifiers connected thereto. For example, binary number 0111 from storage group SA with pulse train P1, P2, P3 sets the TSA storage unit so that it has T39, T41, T43 and T44 fired and T38, T40, T42, T45, nonconducting. The potential from the resistance R44 is fed directly to the bank of TA tubes T51 to T60 to fire T57 on its trigger cathode gap, the rectifiers D38 to D41 being nonconducting because tubes T38, 40, 42, 45 are not fired. On any other one of the ten leads at least one rectifier is limiting the potential to the anode of the fired tube to approximately +20 volts. Therefore, one of the tubes T51 to T60 is fired corresponding to the first received digit in decimal form. Similarly one from each of the groups of the tubes T61 to T70 and T71 to T80 is fired from the TSB or TSC storage units (Fig. 13), and the first three incoming digits are now stored in desired form by one tube being fired at its trigger to cathode gap in each bank of the three banks of ten tubes.

The translator was connected via the connector circuit to the register at the time of P49 and normally the pulse train P1 to 12 from the register is received from the translator completely by the time of P12, but, as a safeguard against faulty operation, use is made of P50 which is sent by the register as a prefix to the P1 to 12 train and the translator only accepts the pulse train P1–12 as correct when it receives P50 as a prefix to P1–P12. Pulse P50 thus ensures that the sequence of operation initiated by P49 has been completed successfully.

When the translator receives P50, tube 246 (Fig. 12) is fired in the same way as T39 to 45 tubes. T46 firing, maintains and extinguishes T47 which has fired from P16. The anode of T47 rises to positive 130 volts and when P17 arrives T48 fired in the same way as T12 and 13 (Fig. 3) were fired. T48 maintains itself and extinguishes T49, which had been fired from P43. The drop in the anode voltage of T48 cuts off valve V17 through the voltage dropping tube T50. The anode voltage of V17 rises and is held at approximately positive 200 volts by rectifier D46 and potentiometer R55. The positive 200 volts is then fed via pentode cathode followers V18 and V19 to the anodes of tubes T51 to T80 (Fig. 14). The three tubes whose trigger cathode gaps were fired from the TSA, TSB, TSC units now break down on their anode cathode gap and maintain. The cathode potential of each of the fired tubes rises to positive 100 volts. Assuming the digits to be 3, 2, 6, tubes T53, T62 and T76 are fired and not others. The positive 100 volts across R45 is fed via R46 to the trigger of T81, the rectifiers D42 and D43 being made nonconducting by the potential on resistors R47 and R48. But the trigger of the tube, such as TT82 which is connected to the tubes T53, T68, and T76, representing the received digits 386, does not have a positive potential on it through R51, the potential of the trigger being held to earth by rectifier D44 conducting to R52, R52 and D44 being low in impedance as compared to R51. Thus T81 fires on its trigger cathode gap and only T81 fires, the trigger of every other such tube as TT being held at earth potential by the resistance rectifier network. A tube similar to T81 is connected for every three digit translaton as required.

It is at the tube T81 and all similar tubes TT that the translation takes place. Each of these tubes represents a three digit translation and by causing the tube to pass a combination of pulses, any number of different digits may be represented. In order to accomplish this route tube T81 or any other tube designated generally by TT has connected to its anode via de-coupling rectifiers a train of pulses selected from P18 to P42 to represent the translation of the particular three digit number. The translation is in binary code similar to that used for transmission from the register to the translator. When the trigger cathode gap of T81 is struck, the voltage change produced on the cathodes of the tubes is negligible, R46 being high impedance compared to R53 and R54, but when the pulse train arrives on the anode it is repeated across the anode/cathode gap and appears on the cathode across R54, the forward impedance of the rectifiers D46 etc. being low compared to the impedance of R53 and R54. The pulse train representing the translation thus appears at the grid of V14; it is amplified by V14 and V15 and is connected via C16 to cathode follower V16 (Fig. 11). The train of translation pulses is then passed from V16 to the resistance R36 in the register Fig. 6. The received pulses are fed via cathode follower V11 to the storage units SR1 to SR6 (Fig. 8) the anodes of which are connected to +130 v. through *be2* (Fig. 3). The first digit of the translation is represented in binary form by P18 to P21. If the first digit is 8, then only P21 is sent and T85 is fired in a similar manner to the firing of T39, T41, T43, T45 in the translator. The tubes fired in the storage units SR1 maintain to positive 130 volts in the same way as tubes T28 and T31 in units SA. The remaining digits of the translation are received and stored on units SR2 to SR6 in the same way. The cathode potential on tubes T82 to T85 is changed only slightly on a firing of the tubes, R56–R59 being high impedance as compared to R60, but since rectifiers D47 to 50 have low forward impedances as compared to R60, when the pulses P32, 34, 36, 38 arrive on the anodes of T82 to T85, the tubes that are struck conduct the pulse through to R60 and thus on R60 a train of pulses appears selected from P32–P38 to represent the tubes T82 to T85 which are fired. Since the tubes fired indicated the digit received from the translator, the pulse group on R60 also represents the first digit of the translation in binary codes. For example, if the digit is 8, P38 only is present across R60. In a similar manner the remaining digits of the translation appear across resistors R61 to R65, always as a selection of the pulses P32, 34, 36, 38.

Figure 12:
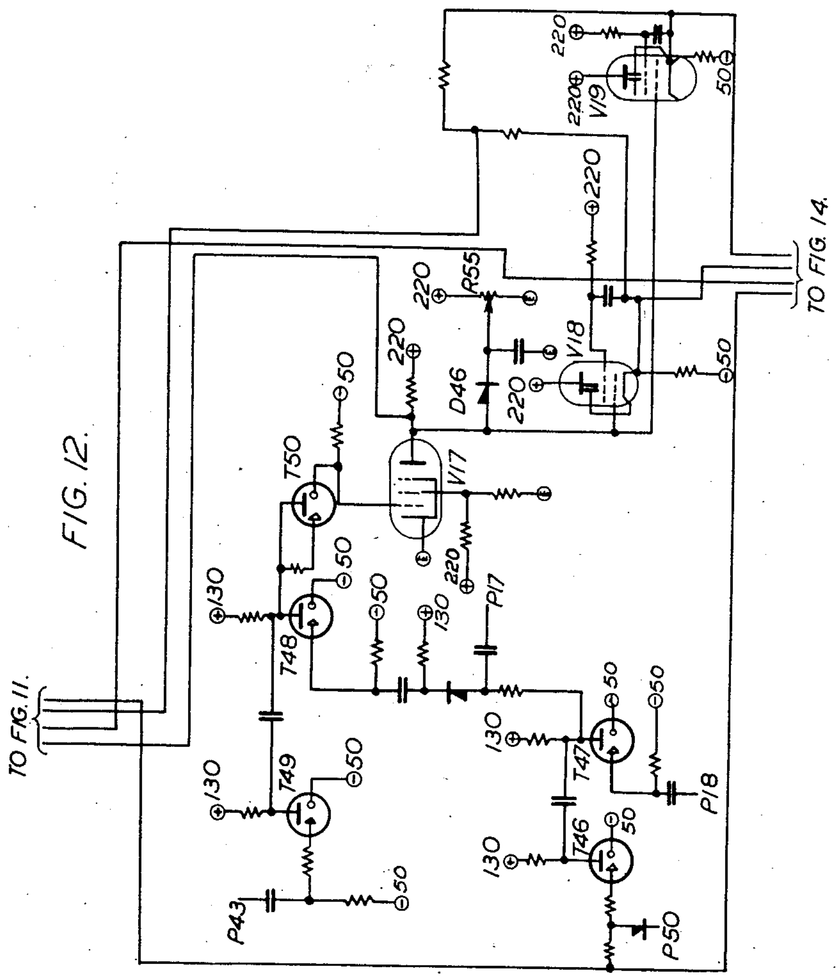
Figure 13:
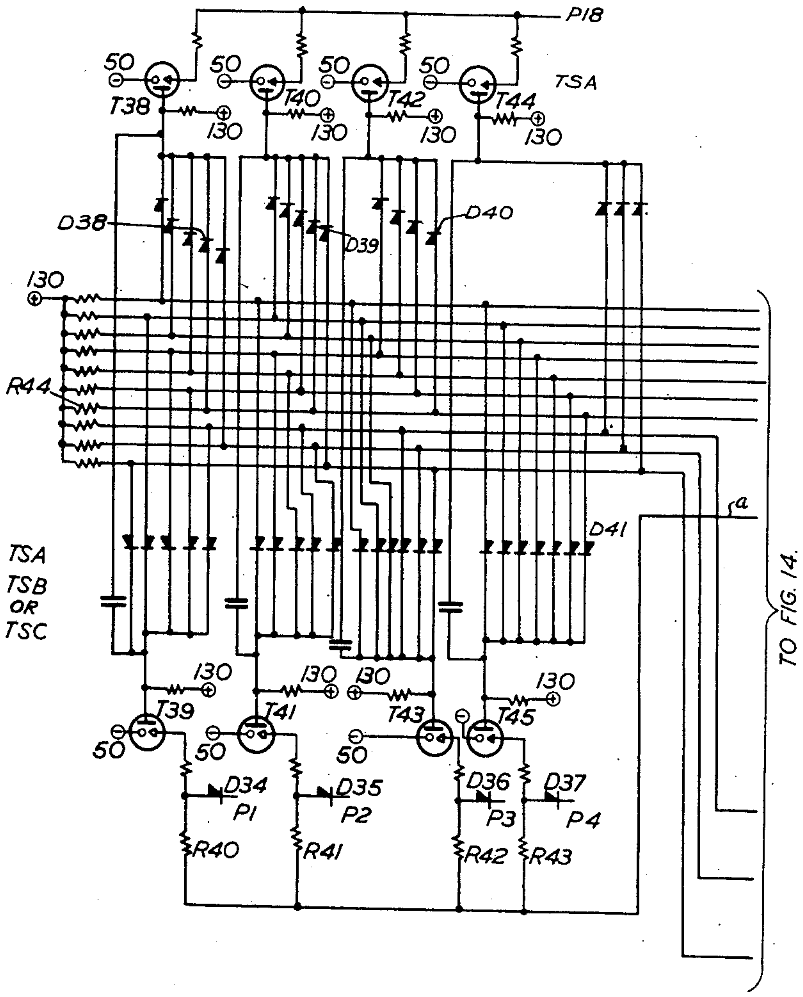

The translator always sends P43 to indicate the end of translation. The pulse P43 is fed via C17, D51, C18 (Fig. 11), to the grid of V16 and thus to the register. Rectifier D51 is conducting due to the positive 200 volts from V18 and V19 (Fig. 12). Pulse 43 also fires T49 (Fig. 12) thus extinguishing T48, increasing the voltage on its anode and driving V17 on. The voltage output of V18 and V19 falls in sympathy and the anode voltage of the tubes T51 to T80 (Fig. 14) therefore falls, extinguishing the fired tubes and consequently extinguishing the route tube T81 or TT. The translator is now set for another call, the tubes in each of the units TSA, TSB, TSC, having been reset in obvious manner by P18.

In the connector circuit B14 (indicated in Fig. 16 by the dotted rectangle in the upper right-hand corner) which with B15 forms a hard valve side stable binary pair similar to B12 and B13, is driven on by P45 and B15 is cut off. The output voltage of the cathode follower V9 is thus reduced and T37 in the register (Fig. 6) is extinguished; the rectifiers D22 and D23 conduct and prevent a further transmission to and from the translator. The pulse P47 drives B15 on (Fig. 16) cutting off B14 and restoring the voltage output of V9 in readiness for the next call from another register which may start with the next pulse P48. This is possible because while the translation has been passing from the translator to the register, the calling pulse of another register can be amplified by V2 (Fig. 16) and fed, as previously described, via valves V3, V4, V5, V6 and V7 to fire T35 in a 2nd register. At P48 therefore the tubes T37 in the second register will fire and connection takes place as described for the first register. This preselection of the next register means that the effective holding time of the translator during the busy period when several registers are waiting for a translation is only 50 milliseconds and the waste of 50 m./s. between utilisations of the translator is avoided.

Although the number of registers which a connector circuit can connect to the translator is limited to the number of pulses in a pulse train, two or more connector circuits can be used, the lead connected to cathode of V2 being switched at 20 I. P. S. synchronised to any pulse from P2–P44 between the connector circuit and the grid of V2 in all circuits that are connected together. In this way 47 registers per connector circuit can be connected to the translator, the pulse synchronising the 20 I. P. S. switching not being allotted to a register.

Figure 7:
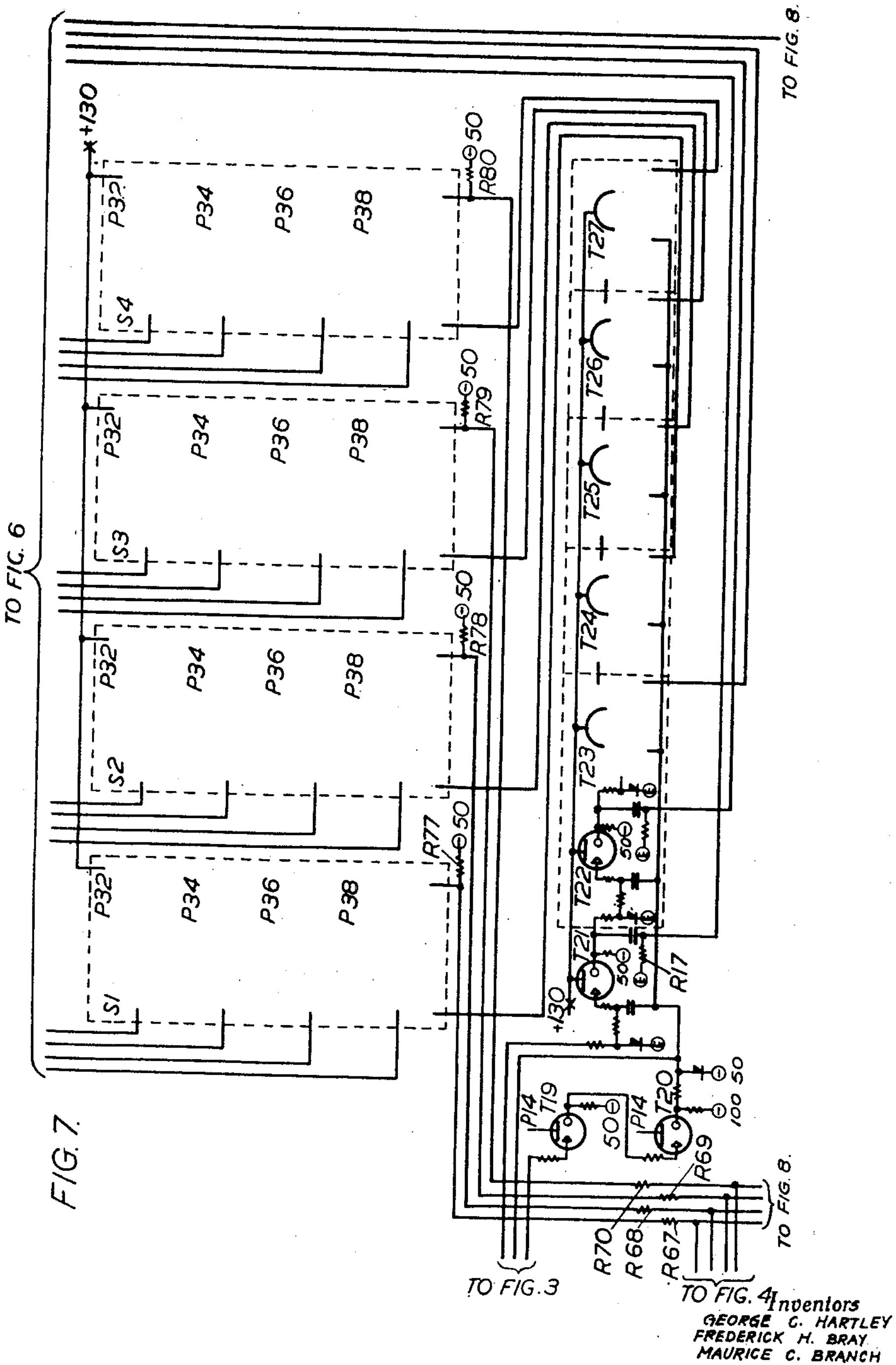

The pulse P43 is sent from the translator to the register indicating the end of translation, and is detected by the resistance rectifier network R66, D52 (Fig. 4) in a manner already described for tube T39, and fires T86 (Fig. 4), and T101 (Fig. 9). T86 is the first tube in the outgoing distribution train T87–96 controlling the transmission of the digits stored on units SR1 to SR6 (Fig. 8) or S1-4 (Fig. 7).

Meanwhile the remaining incoming digits, that is, those not requiring translation, have been stored on storage units SR1 to S1 (Fig. 7) in the same way as the first 3 were stored on SA—SB—SC. Storage units S1 to 4 are similar to units SA, SB, SC. The train of pulses selected from P32 to P38 are assembled on the cathode resistors R77 to R80 of these units in exactly the same way as the pulses are formed across R60 to R65 for units SR1 to 6 (Fig. 8).

The train of pulses across R60 is prevented from reaching T104 (Fig. 8) while D57 is conducting to the negative 50 volts via R81 (Fig. 4), R71 being high impedance compared with R81, but when T86 (Fig. 4) fires the voltage across R81 rises to a positive 70 v., D57 no longer conducts, and the pulses across R60 are allowed to reach the trigger of T104. The pulses P32, P34, P36, P38 are connected to the anode of T104, and when any of these pulses appears at the same time on the trigger and anode they are gated through from anode to cathode; thus T104 functions as a buffer stage or amplifier between R60 and T105 (Fig. 9), and the pulse train across R60 is reproduced across R82. At any time when tube T103 and R110, (Fig. 9), are not conducting, T107 fires by the bias from R83 and pulse P25 and tube T108 by pulse P13, in a similar manner to which tubes T12 and 13 (Fig. 3), were fired. The tubes extinguish one another in turn. This action will be referred to again later. At the same time as T107, tube T111 fires momentarily and P25 connected to its anode is gated to the cathode, as in the case of T23 (Fig. 6). The pulse from the cathode of T111 fires tubes T113, T115, T117 and T119, thus preparing the outgoing binary counting train GA1-GA7. When T108 was extinguished the voltage on its anode rose to positive 130 and rectifier D63 is cut off and the pulse train across R82 appears at the trigger of T105 and is repeated by T105 as T104 (Fig. 8) repeated the pulses. From the cathode of T105, the pulse sets the binary counting train T112 and 119, similarly to the manner in which the tubes T39, T41, T43, T45 were set in the translator, Fig. 13.

For example, if the first digit of the translation is 8, it is represented in binary by 1000 and also in the storage unit SR1 by pulse P38; thus T118 is fired by coincidence of P38 from T105 with P38 connected to the positive end of D64. The counting train T112 to T119 is thus set to the complement with reference to 15 of the number stored on the SR1 unit. That is to say, in the above example, when SR1 stores 8 the tube T118 was fired, thus setting the counting train at 7, which is the complement of 8 with respect to 15. Reference to the following table shows the manner in which the setting of the outgoing binary counting trains T112 to T119 differs from the storage units SA, SB, SC, S1-4, SR1-6 and the binary counting train for each of the digits 1 to 0, and makes clear the manner in which the outgoing train is set to the complement of the incoming digit with reference to 15.

In each of the columns of the table, the symbol X represents a fired tube and O represents an unfired tube, and the designation of each tube (shown only for the Normal position and for digit 7), as it would appear if mounted in a group of 4 or 8 tubes, is placed beside the symbol representing its condition. In column 2 the designations are for storage unit SA, the other similar storage units following the same pattern:

| Digit | I/C Binary Counting Train T10-17 | Storage Units SA-B-C, SR1-6, S1-4 | O/G Binary Counting Train T112-119 |
|---|---|---|---|
| Normal Position (Awaiting Digit). | T10 X O T11 | T28 O | T112 O X T113 |
| | T12 X O T13 | T29 O | T114 O X T115 |
| | T14 X O T15 | T30 O | T116 O X T117 |
| | T16 X O T17 | T31 O | T118 O X T119 |
| 1 | T10 O X T11 | T28 X | T112 X O T113 |
| | T12 X O T13 | T29 O | T114 O X T115 |
| | T14 X O T15 | T30 O | T116 O X T117 |
| | T16 X O T17 | T31 O | T118 O X T119 |
| 2 | X O | O | O X |
| | O X | X | X O |
| | X O | O | O X |
| | X O | O | O X |
| 3 | O X | X | X O |
| | O X | X | X O |
| | X O | O | O X |
| | X O | O | O X |
| 4 | X O | O | O X |
| | X O | O | O X |
| | O X | X | X O |
| | X O | O | O X |
| 5 | O X | X | X O |
| | X O | O | O X |
| | O X | X | X O |
| | X O | O | O X |
| 6 | X O | O | O X |
| | O X | X | X O |
| | O X | X | X O |
| | X O | O | O X |
| 7 | O X | X | X O |
| | O X | X | X O |
| | O X | X | X O |
| | X O | O | O X |
| 8 | X O | O | O X |
| | X O | O | O X |
| | X O | O | O X |
| | O X | X | X O |
| 9 | O X | X | X O |
| | X O | O | O X |
| | X O | O | O X |
| | O X | X | X O |
| 0 | X O | O | O X |
| | O X | X | X O |
| | X O | O | O X |
| | O X | X | X O |

Figure 4:
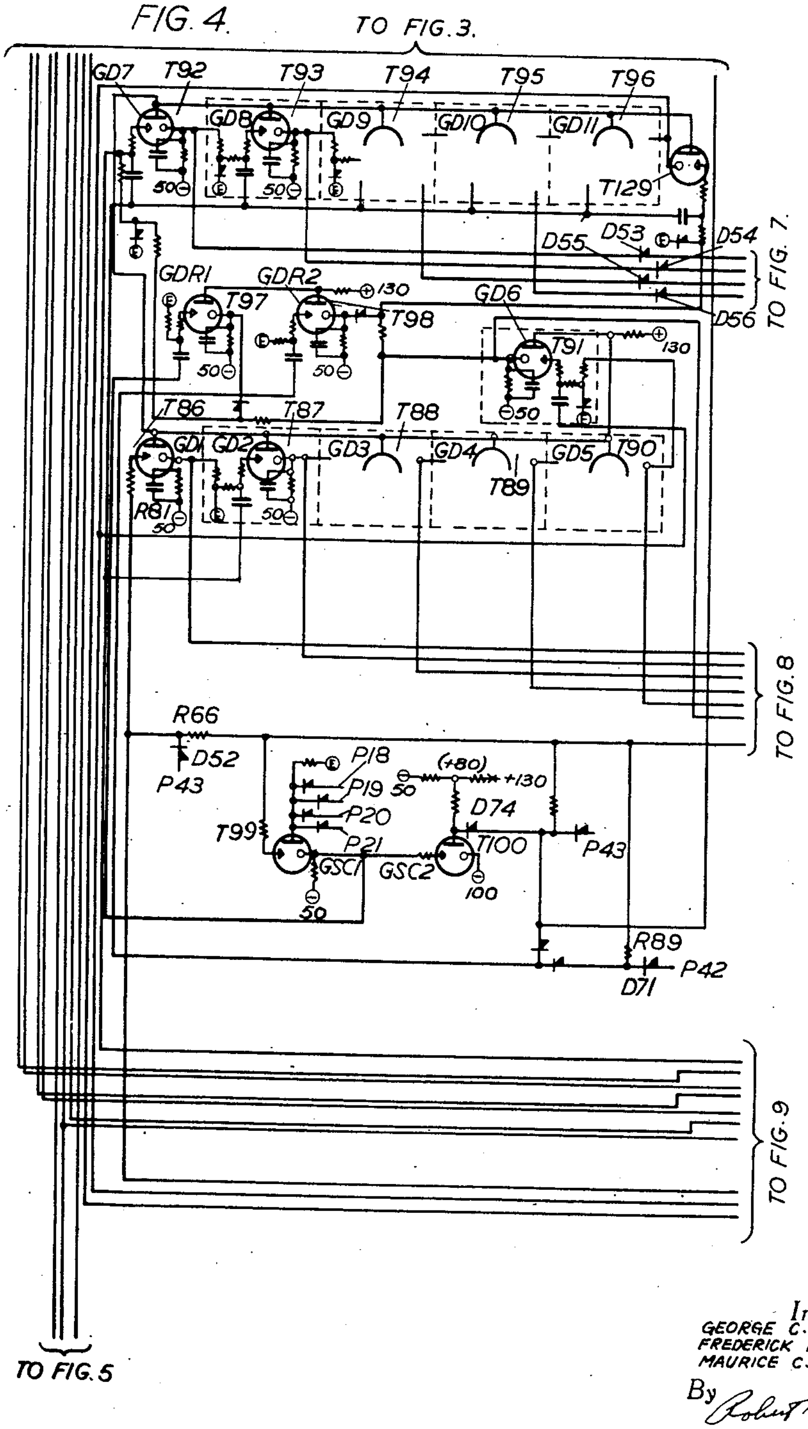
Figure 5:
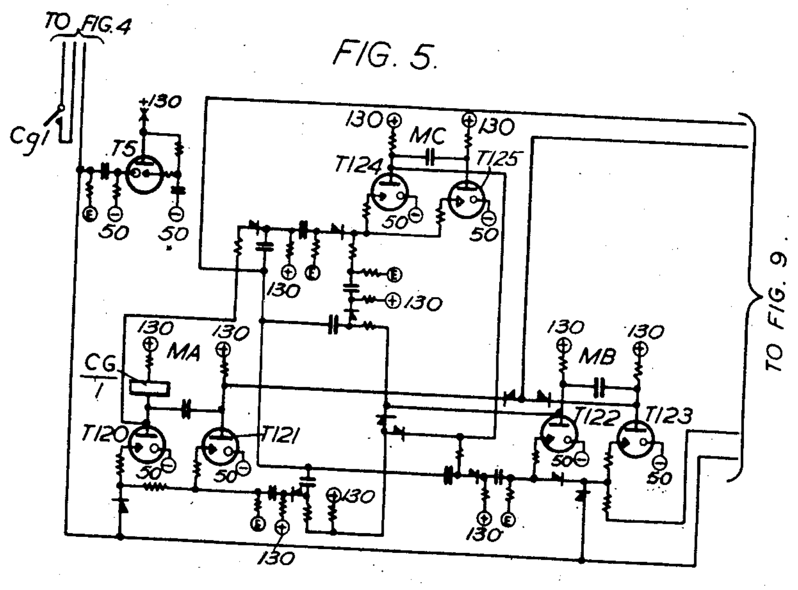

The first pulse of the train of pulses from T105 also fires T110, thus extinguishing T109. T110 firing causes rectifier D75 to conduct and prevents T111 and T107 being fired by future P25 pulses. Pulse P12 is gated by T106 (operating in similar manner to T111) and a pulse produced on the cathode of T106 is fed to the outgoing distribution train T87 to T96 (Fig. 4). T87 is already biassed from T86 and when the pulse arrives, it fires and T86 is extinguished, as in the case of T7-9 train (Fig. 3). The pulse train across R60 (Fig. 8) is now blocked by D57 conducting and that across R61 is allowed to proceed by D58 cutting off due to the firing of T87. Thus the pulse train representing the second digit can now reach R82 (Fig. 9) in a similar manner to the first digit. But before this train arrives, which will be at P32, the tube T108 (Fig. 9) is fired by P13 and rectifier D63 conducts preventing pulses across R82 from reaching the tube T105, and similarly D95 conducting prevents T106 gating further P12 pulses to the outgoing distribution train, tubes T87 to T96. Tube 108 firing extinguishes T107 and thus, assuming *dd1* contact to be open and tubes T121 and T123 (Fig. 5) non conducting, positive 130 volts is applied to resistance R84 (Fig. 9) and any pulses applied to C19, as will be explained later, fires tube T126.

It has been stated that the contacts *dd1* are assumed open. These contacts are operated from relay DD, the function of which will be later explained. It will be remembered that tubes T123 and T120 (Fig. 5) are fired from T5 when the circuit is seized. The tubes T120 to T125 count the ten I. P. S. pulses received over *dt1* (Fig. 3), as described later, until T121 and T123 are simultaneously in a fired position. Only the simultaneous firing of these two tubes allows the appearance of a positive potential on R84 when permitted by T109 and T107 circuits, as already described. This provides a safeguard against outgoing digits being sent out too soon after outgoing seizure. The anode of T126 (Fig. 9) is connected by *dt1* contacts to a positive 130 volts supply interrupted for 33 milliseconds ten times a second, that is, a break of 33% at ten I. P. S., and from this supply pulses of positive 50 volts are produced by the network R85 to R87, C21 and D67 in exactly the same way as R6–8, C6 and D7 (Fig. 3) produced pulses on the operation of *ae1* contacts. These 10 I.P.S. pulses are applied via condenser C19 and R87 (Fig. 9) to the trigger of tube T126 and the tubes fire, producing a pulse in transformer TR1 via C20. These pulses are limited to positive 50 volts by D66 and fed to the counting train T112 to T119 and to tube T127.

When the positive 130 volt pulse to the anode of T126 ends, the tube extinguishes but rectifier D68 prevents any negative pulse which may be produced from being effective. Thus under the control of the positive potential applied to R84, tube T126 repeats the pulses applied to C19 to the counting train T112 to T119 and the tube 127. The counting train T112 to T119 functions in the same manner as the T11 to T17 train, the pulses from transformer TR1 count the train through from the digit to which it was set by the pulse train from T105. Tube 127 is also fired by the pulses from TR1 and AG relay operates; tube T127 extinguishes when the positive 130 volts pulse is disconnected, thus releasing the AG relay. Tube T127 and AG relay thus convert the ½ millisecond pulses at 10 I. P. S. from the transformer TR1 into pulses of 33% break ratio at 10 I. P. S., that is, dial impulses. The AG relay sends these impulses back to the first code selector in the usual manner.

The outgoing binary counting train T112 to T119 (Fig. 9) was set to the complement with respect to 15 of the numbers stored on SR1, and thus, when the train has counted the number stored on SR1, it has reached its 15th position. A pulse is produced across resistance R88 (Fig. 9) in a similar manner to that previously produced by the network R9–11, C8, D8 (Fig. 3), tubes T114, T116, T118 being non-conducting just before the 15th position of the counting train is reached. The pulse produced across resistance R88 fires tube T109 and rectifier D69 conducts and reduces the potential on R84 to positive 20 volts, discharging C19. Tube T126 can thus no longer be fired by the pulses applied to C19 and no further pulses are fed to the counting train T112–119 or the tube T127 and when the AG relay is released it is not re-operated and the line loop to the first code selector link circuit is held closed. The first digit of the translation has now been sent back to the first code selector. The tubes T120–125 (Fig. 5) now measure the outgoing inter-digital pause in terms of 10 I. P. S. pulses. Tubes T124 and T125 conduct alternately on every pulse; tubes T122 and T123 conduct alternately on every second pulse; tubes T120 and T121 conduct alternately on every fourth pulse. Normally tubes T120, T122, T124 are conducting. The pulse produced across R88 at the end of the outgoing impulsing fires tube T123, extinguishing T122. The next 10 I. P. S. pulse fires T125, biassed from the anode of T122, and T124 is extinguished. The third 10 I. P. S. pulse fires T121, biassed from the anode of T122, and T124, and T122, biassed from the anode of T124, and T124 biassed from the anode of T120; tubes 120, 123 and 125 are extinguished. The fourth pulse fires T125, biassed from the anode of T120, and extinguishes T124. The fifth pulse fires T124, biassed from T120, and T123, biassed from T124; T122 and T125 are extinguished. The sixth pulse fires tube T125, biassed from T122, and T124 is extinguished. The seventh pulse fires T120, biassed from tubes T122 and T124, and tubes T122, biassed from tube T124, and tube T124 biassed, from tube 122, tubes 121 and 123 and 125 are extinguished, further 10 I. P. S. pulses have no effect on the T120 to T125 circuits, the tubes T120, T122 and T124 all conducting, but the eighth pulse fires tube T126 (Fig. 9) and starts the sending of the next digit exactly as the first digit was sent, when permitted by T109 and T107 (Fig. 9) and contacts *dd1* (Fig. 3). Thus an interdigital pause of 600 milliseconds minimum is ensured. Relay CG (Fig. 5) operates when tube T120 fires and releases when tube T121 fires, the relay serves to short-circuit DD relay (Fig. 3) during impulsing out but it is released between digits to permit DD to operate if a line reversal is sent back to the register. Relay, DD is a polarised relay so that only a line reversal operates it, and its *dd1* contact (Fig. 3) causes the rectifier D70 (Fig. 9) to conduct, preventing the positive potential from the anodes of T109 and T107 from biassing tubes T126 and thus preventing impulses from being sent out to the positive and negative lines. This allows circuits into which the first code selector is working to delay the impulsing out of any digit from the register until the circuit is ready to receive.

It will be remembered that T109, firing from the pulse produced across resistance R88, extinguished 110 (Fig. 9), and thus pulse P25 is permitted to pass from anode to the cathode of T111, as previously described, and reset the counting train T112 to T119. At the same time, P25 fires tube T107, biassed from resistance R83 with tubes T110 and T103 non-conducting. Tube T107, firing, extinguishes T108, and rectifier D33 cuts off and the pulse train representing the next digit to be sent passes from resistance R82 via tube T105 to set the counting train T112 to T119. The circuit operation now continues exactly as described for the first digit, the outgoing distribution train T86 to T96 moves at time P12 to gate the next digit code from R62 or R63 or R65 to R82, until an empty storage unit SR1 to SR6 (that is a storage unit in which no tubes have been fired) is reached. Although provision is made to store a six digit translation, the register is able to deal with any number of digits from 1 to 6, and if no translation is sent from the translator to any of the units SR2–6, provision is made to skip over such units during the inter-digital pause time. Such an empty storage unit does not send a pulse code to resistance R82 and, therefore, T110 is not fired as it normally is, and the potential across resistance R84 is held at approximately positive 20 volts, preventing tube T126 from firing and the outgoing digits from being transmitted. But P12 is still gated by T106 to move the distribution train T86–T96, and the pulse train representing the next digit of the translation is switched across R85. Empty storage units are thus skipped over at the rate of 1 per 50 milliseconds.

The outgoing digit distribution train T86 to T96 reaches tube T92 after examining the six storage unit SR1–6 and sending any digits stored. T102 (Fig. 9) is fired in parallel with T92 and the operation of the T107, T108 and T109 and T110 circuits is changed so that an empty storage unit is not skipped but is continuously examined until a digit is stored. This is necessary because the four numerical digits still remain to be sent but their arrival in the register may be delayed by the calling subscriber. Tube 102 firing extinguishes T101 so that T108, biased from the anode of T101, is not fired by P50 before P13 arrives, thus D65 conducts and the pulse P12 is not gated by T108 to move the outgoing distribution train T86–T96 unless T110 is fired by an incoming pulse train for a storage unit S1–4 (Fig. 7) via T105. When T110 is fired, pulse P50 no longer fires T108 because rectifier D76 conducts and P12 is gated via T108 to move the outgoing distribution train and switch the next digit pulse train to RS2. T108 is then fired by P13 and the rest of the circuit operates exactly as described for the transmission of the translation digits. After the fourth numerical digit has been transferred from S4 storage unit (Fig. 7) to the T112–T119 counter (Fig. 9), for transmission, T96 (Fig. 4) is fired and in parallel with it, T103 (Fig. 9). Tubes T95 and T102 are extinguished. Pulse P25 can now not fire T107 when the digits stored in T112–T119 train has been transmitted because rectifier D77 conducts and hold the potential at R83 to −20 volts from the anode of T103. Thus no further information is gated to the T112–T119 outgoing binary counting train. When the T112 to T119 train has counted through to 15 and the outgoing digits have been transmitted, the pulse produced, as already described, across resistance R88, now fires T128, the tube being biased by tubes T101 and T102, both non-conducting in addition to the tubes T114, T116, and T118 in the counting train. The relay BG (Fig. 9) operates when T128, the anode of which is connected to +130 volts through *be2* (Fig. 3), fires and the circuit proceeds to clear in the usual manner. The P lead to the first code selector link circuit is disconnected (Fig. 3) and the link circuit releases and in turn releases the AE relay in the register and the relay BE releases, tube T2 being extinguished by the firing of T1, as already described. The relay BE releasing disconnects the positive 130 volts supply from the storage units SR1–6, S1–4 and SA, SB and SC and all the tubes in the storage unit are extinguished; tube 128 is also extinguished and BG relay releases. The incoming digit distribution train T21 to T27 is reset by the release of relay BG, all the tubes being extinguished. The register can now be reseized from the link circuits and receive another call.

On certain types of calls known as "code only" calls, only the translation is sent to line and no numericals follow it. The translator always includes pulse P42 as well as P43 in the translation for these calls and this pulse is detected in the register after passing through cathode follower V11 (Fig. 6), by the rectifier D71 and resistance R89, and fires tube T93. The bias from the cathode of T91 in the outgoing distribution train (Fig. 4) is then switched from T92 to T129. Thus all the tubes T92 to T96 normally gating the information from the S1–4 storage unit to the sending counting train T112 to T119 are thereby not fired and no numerical digits can be transmitted if they are accidentally dialled by the subscriber. The register thus sends the digits of the translation and then releases.

To avoid using the translator from the simple but quite frequent calls such as 0 level calls to the operator, the train of pulses representing the translation is connected to the anode of tube T130 (Fig. 6) in the register. The digit 0 received as a first digit by the counting train T10–T17 (Fig. 3) renders rectifiers D72 and D73 non-conducting and tube T130 is fired by the pulse from the cathode of T21 (Fig. 7). The translation for the 0 level call, on the anode of T130, appears at the cathode exactly as in the case of the TT tubes (Fig. 14), and is fed via cathode follower V11 to storage units SR1–SR6 and the circuit continues to function as with a normal "code only" call.

A subscriber may dial a "spare" code, that is, one for which there is no translation. NU tone is returned to the subscriber in the following manner. Every translation contains one of the pulses P18 to 21 representing the first digit of the translation, these pulses are normally fed by V11 to fire tube T99 (Fig. 4) and T99 repeats the pulses, (they being connected to its anode in the same way as T104) (Fig. 8) to fire tube T100, the anode of which is connected to +130 volts through *be2* (Fig. 3). Rectifier D74 conducts and pulse P43, the end of translation pulse, does not fire tubes T98 and T131. If tube T99 does not receive any of the pulses P18 to 21 and therefore if tube T100 is not fired, pulse P43 which is always sent by the translator fires tube T98 and 131. T98 prevents any numerical digits being transmitted exactly as the case of a "code only" call and T131 operates relay Sc (Fig. 3) in its anode circuit which is connected to +130 volts through *be2*. Contacts *sc1* operate Z relay. Z relay locks and applies earth to the FR lead to the line circuit. "Forced release" takes place in the known manner, the subscriber being given NU tone from the first code selector. The link circuit releases the AR relay in the register (Fig. 3) relay BE is released and relay Z slowly releases the circuit which clears as previously described and is ready to receive another call.

The relays W and Z are "time pulse" relays and force the release of the circuit if it is held for more than 30–60 seconds without receiving a digit from the subscriber. With the contact *be4* operated, W relay operates from a "start" pulse S, locks and prepares Z relay to operate from a Z pulse which occurs 30 seconds later. Normally DT relay operates when the first digit has been received, as already described, and Z relay can then not operate, the circuit being broken at *dt2*. If the subscriber does not dial a digit within 30 seconds DT relay does not operate and the Z pulse operates Z relay. Z relay locks and an earth is connected to the FR lead to the link circuit, causing forced release of the circuit. Relay AE is released by the link circuit, BE relay releases and Z releases slowly. The circuit is then released as previously described and is ready to receive another call.

We claim:

1. Electrical equipment in which a number of sets of signals can be translated into respective predetermined different sets of signals comprising a plurality of signal receiving means, translating means common to said signal receiving means, means for producing pulses spaced in time within a predetermined time cycle, means for applying a predetermined particular one of said pulses to each one of said signal receiving means, means for applying certain other of said pulses to each of said signal receiving means, and means in each signal receiving means responsive to said particular one of said pulses for causing the transmission of coded sets of said other applied pulses to said translating means to transfer the signals received by said receiving means.

2. Electrical equipment, as claimed in claim 1, in which said translating means comprises a plurality of coding devices each characteristic of a set of translated signals to be transmitted, means responsive to the sets of pulses received by the translating means for selecting one of said coding devices, and means controlled by said selected coding device for transmitting sets of pulses having predetermined different time positions representing the translated sets of signals to the signal receiving means.

3. Electrical equipment in which a number of sets of signals can be translated into respective predetermined different sets of signals comprising a plurality of signal receiving means, translating means common to said signal receiving means and electrically connected thereto, each signal receiving means comprising storage units for storing sets of signals which are not to be translated and storage units for storing a variable number of translated sets of signals, means for producing pulses spaced in time within a predetermined time cycle, means for applying certain ones of said pulses to said signal receiving means, means responsive to said certain applied pulses for transmitting signals to be translated to said translating means, means for applying certain other of said pulses to said translating means, means controlled by said other applied pulses for sending translated sets of signals from said translating means to said signal receiving means, means for detecting the first empty translated signal storage unit in said signal means during the sending sequence, means for storing the received translated sets of signals in said translated digit storage units, means for transmitting from said receiving means stored translated signals in sequence followed by stored untranslated signals, and means controlled by said detecting means for initiating transmission of said stored untranslated signals.

4. Electrical equipment in which a number of sets of signals can be translated into respective predetermined different sets of signals, comprising a number of signal-receiving means, translating means common to said signal-receiving means and electrically connected therewith, each signal-receiving means comprising storage units for storing signals which are not to be translated aid storage units for storing translated signals, means for producing pulses spaced in time within a predetermined time cycle, means controlled by certain of said pulses for transferring signals from one of said signal receiving means to said common translating means, said common translating means comprising discriminating means for detecting signal combinations received unaccompanied by signals which are not to be translated, means in the common translator under control of said discriminating means for sending a discriminating signal to a signal-receiving means when said discriminating means is operated, and signal responsive means associated with each signal-receiving means adapted to respond to said discriminating signal and to modify the operation of the signal-receiving means accordingly.

5. Electrical equipment in which a number of sets of signals can be translated into respective predetermined different sets of signals comprising a number of signal-receiving means, translating means common to said signal-receiving means and electrically connected thereto and other translating means individual to a signal-receiving means and electrically connected thereto for translating a particular set or sets of signals but not all sets of signals which the said signal-receiving means is capable of receiving, means for producing pulses spaced in time within a predetermined cycle, means controlled by said pulses for transferring sets of signals from said signal receiving means to said common translating means, and means controlled by said particular set or sets of signals for initiating the operation of said individual translating means.

6. Electrical equipment, as claimed in claim 1, in which the said signal receiving means comprises a first plurality of sets of static electric switches for storing sets of signals representative of a number in one code and a second plurality of sets of static electrical switches for storing translated sets of signals representative of the same number in another code.

7. Electrical equipment comprising a register, means for receiving signals in said register, a translator for translating said signals into a predetermined translation, means for producing pulses spaced in time within a predetermined repetitive time cycle, means for transferring said signals to said translator in the form of a coded pattern of certain of said pulses, pulse means for transferring the translation from said translator to said register in the form of a coded pattern of others of said pulses, said register comprising electric discharge tubes for storing both said received signals and said translation, and said translator comprising electric discharge tubes for both receiving the signals to be transmitted from the register and for transmitting said predetermined translation to the register.

8. Electrical equipment, as claimed in claim 7, further comprising, means for applying a particular sequence of pulses from said pulse producing means to the register said pulses controlling the sequence of signal transfer between said register and the translator, and means for applying a different sequence of pulses to said translator said last-mentioned pluses controlling the sequence of translation transfer from said translator to said register.

9. Electrical equipment, as claimed in claim 8, in which both transferring pulse means utilize a coded pattern of pulses.

10. Electrical equipment, as claimed in claim 9, further comprising a single connector between the register and the translator for transmitting each coded pattern of pulses.

11. Electrical equipment, as claimed in claim 10, in which means is provided for storing binary system signals and translations in the register, said means comprising electronic storage tubes, there being one for each required digit in the binary system.

12. Electrical equipment, as claimed in claim 11, in which means is provided for biasing an electric discharge tube in a predetermined direction, whereby the application of a pulse, in the sequence of pulses, to the anode of said electric discharge tube, biassed in the same potential direction as the pulse, fires the tube to initiate the operation controlled by said pulse.

13. Electrical equipment, as claimed in claim 12, comprising a plurality of registers and in which an electronic connector is provided for associating the translator with any one of said plurality of registers.

14. Electrical equipment, as claimed in claim 13, in which means is provided in the connector for preselecting a second register for association with the translator while a first register is still associated with the translator.

15. Electrical equipment, as claimed in claim 14, in which means is provided for applying to each of said plurality of registers a different pulse of the continuously repeated train of pulses and means is provided for operatively associating a register with the translator responsive to the coincidence of appearance of the pulse applied to the register both in the translator and the connector but only when the translator is disengaged.

16. Electrical equipment as claimed in claim 15, comprising means responsive to certain of said pulses for causing said translator to receive from said first register the signals to be translated, means responsive to one of said pulses for causing said translator to transmit the translated sets of signals to the first register, means responsive to another of said pulses for causing said translator to receive from said second register further sets of signals to be translated and means responsive to still another of said pulses for causing the translator to transmit the translation of other sets of signals during the subsequent cycle of pulses.

17. Electrical equipment comprising means for receiving and storing sets of signals, means for transmitting signals, means for transferring said signals from said storing means to said transmitting means, means for producing pulses spaced in time within a predetermined repetitive time cycle, means for utilizing predetermined ones of said pulses for operating said transferring means for transferring the stored signals sequentially to said transmitting means, and means for utilizing predetermined ones of said pulses for operating said transmitting means when the signals have been transferred to transmit said signals.

18. Electrical equipment according to claim 17, further comprising means for translating stored signals into predetermined different sets of signals, and means controlled by predetermined ones of said pulses for transferring certain of the stored signals to said transmitting means via said translating means.

References Cited in the file of this patent

UNITED STATES PATENTS

| Number | Name | Date |
|---|---|---|
| 1,674,134 | Schwartz | June 19, 1928 |
| 1,705,462 | Gillings | Mar. 12, 1929 |
| 1,757,446 | Wright | May 6, 1930 |
| 1,963,929 | Baker | June 19, 1934 |
| 2,248,583 | Potts | July 8, 1941 |
| 2,317,471 | Meacham | Apr. 27, 1943 |
| 2,341,746 | Taylor | Feb. 15, 1944 |
| 2,379,715 | Hubbard | July 3, 1945 |
| 2,407,320 | Miller | Sept. 10, 1946 |
| 2,408,077 | Labin | Sept. 24, 1946 |
| 2,409,063 | Ostline | Oct. 8, 1946 |
| 2,520,142 | Herbst | Aug. 29, 1950 |
| 2,576,099 | Bray et al. | Nov. 27, 1951 |